US012219300B2

(12) United States Patent
Inada et al.

(10) Patent No.: US 12,219,300 B2
(45) Date of Patent: Feb. 4, 2025

(54) METHOD FOR PROCESSING IMAGE DATA, IMAGE DATA PROCESSING APPARATUS, AND IMAGE DATA PROCESSING SYSTEM

(71) Applicant: Panasonic Intellectual Property Management Co., Ltd., Osaka (JP)

(72) Inventors: Yasuhisa Inada, Osaka (JP); Atsushi Ishikawa, Osaka (JP); Toshio Mochida, Kanagawa (JP); Taku Hirasawa, Kyoto (JP); Kazuya Hisada, Nara (JP); Yumiko Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 526 days.

(21) Appl. No.: 17/539,344

(22) Filed: Dec. 1, 2021

(65) Prior Publication Data

US 2022/0094899 A1  Mar. 24, 2022

Related U.S. Application Data

(63) Continuation of application No. PCT/JP2020/024750, filed on Jun. 24, 2020.

(30) Foreign Application Priority Data

Jul. 25, 2019 (JP) ................................. 2019-136806

(51) Int. Cl.
*G06T 7/90* (2017.01)
*G06F 3/0482* (2013.01)
(Continued)

(52) U.S. Cl.
CPC ............. *H04N 9/77* (2013.01); *G06F 3/0482* (2013.01); *G06Q 30/0601* (2013.01);
(Continued)

(58) Field of Classification Search
None
See application file for complete search history.

(56) References Cited

U.S. PATENT DOCUMENTS 6,504,943 B1 * 1/2003 Sweatt .................. G06V 20/13
                                                          348/169
7,450,761 B2 * 11/2008 Portigal ................. G06V 20/13
                                                          382/113
(Continued)

FOREIGN PATENT DOCUMENTS

JP       2001-119556      4/2001
JP       2005-248393      9/2005
(Continued)

OTHER PUBLICATIONS

International Search Report of PCT application No. PCT/JP2020/024750 dated Aug. 25, 2020.

*Primary Examiner* — Tsung Yin Tsai
(74) *Attorney, Agent, or Firm* — Rimon P.C.

(57) ABSTRACT

A method for processing image data according to an aspect of the present disclosure includes obtaining first image data indicating a hyperspectral image of a target captured in first background light, generating, on a basis of the first image data, first spectral data indicating an estimated spectrum of the first background light, and generating, from the first image data, at least one piece of second image data indicating at least one image of the target in at least one type of second background light, which is different from the first background light, using at least one piece of second spectral data indicating at least one spectrum of the at least one type of second background light and the first spectral data.

24 Claims, 20 Drawing Sheets

(51) Int. Cl.
  *G06Q 30/0601* (2023.01)
  *G06T 7/00* (2017.01)
  *H04N 9/77* (2006.01)
  *H04N 23/60* (2023.01)

(52) U.S. Cl.
  CPC .............. *G06T 7/0002* (2013.01); *G06T 7/90* (2017.01); *H04N 23/64* (2023.01); *G06T 2207/10024* (2013.01); *G06T 2207/30168* (2013.01)

(56) References Cited

U.S. PATENT DOCUMENTS

| | | | |
|---|---|---|---|
| 8,731,250 B2 * | 5/2014 | Martin | G06V 10/143 382/124 |
| 9,864,929 B2 * | 1/2018 | Gu | G06F 18/23 |
| 11,893,771 B2 * | 2/2024 | Moon | G06V 10/60 |
| 2009/0128587 A1 | 5/2009 | Komiya et al. | |
| 2011/0085708 A1 * | 4/2011 | Martin | G06V 40/1324 382/115 |
| 2016/0069743 A1 * | 3/2016 | McQuilkin | A22B 5/007 356/416 |
| 2016/0078317 A1 * | 3/2016 | Gu | G06V 10/60 382/190 |
| 2018/0116494 A1 * | 5/2018 | Treado | A61B 1/07 |
| 2019/0114694 A1 | 4/2019 | Horimoto | |
| 2021/0224563 A1 * | 7/2021 | Patel | G06F 18/214 |

FOREIGN PATENT DOCUMENTS

| | | |
|---|---|---|
| JP | 2009-124647 | 6/2009 |
| JP | 2010-056628 | 3/2010 |
| WO | 2017/090764 | 6/2017 |

* cited by examiner

FIG. 8
| DATE AND TIME | PLACE | WEATHER | SPECTRAL DATA |
|---|---|---|---|
| 2019:01:01:09:00:00 | TOKYO | SUNNY | 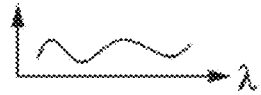 |
| 2019:01:01:09:00:00 | OSAKA | CLOUDY |  |
| 2019:01:01:09:00:00 | NEW YORK | SUNNY |  |
| 2019:01:01:09:00:00 | LONDON | RAINY |  |
| ... | ... | ... | ... |

METHOD FOR PROCESSING IMAGE DATA, IMAGE DATA PROCESSING APPARATUS, AND IMAGE DATA PROCESSING SYSTEM

BACKGROUND

1. Technical Field

The present disclosure relates to a method for processing image data, an image data processing apparatus, and an image data processing system.

2. Description of the Related Art

With multiwavelength camera systems such as a hyperspectral camera and a multispectral camera, spectral information regarding captured images can be analyzed in detail.

Reflection spectral information regarding an object and spectral information regarding background light illuminating the object are superimposed upon an image captured by a camera. If a spectrum of background light at a time when an image of an object is captured and a spectrum of background light in an environment in which a person actually looks at the object are different from each other, for example, information perceived by the person can be different between when he/she looks at the object in the image and when he/she looks at the actual object.

Japanese Unexamined Patent Application Publication No. 2009-124647 discloses a color reproduction system that displays, on a monitor in a user system, an image subjected to color conversion performed in a server system. This color reproduction system provides a web page having a function of allowing the user to select a type of lighting to be applied to an image of a product to be displayed and changing the appearance of the image in accordance with the selected type of lighting. Japanese Unexamined Patent Application Publication No, 2005-248393 discloses a system that corrects illuminance of a composite image including clothes fitting information using illuminance information indicating illuminance inside a certain building or illuminance at least based on weather in a certain area or place.

SUMMARY

One non-limiting and exemplary embodiment provides a method for improving color reproducibility of an image to be provided for a user.

In one general aspect, the techniques disclosed here feature a method for processing image data. The method includes obtaining first image data indicating a hyperspectral image of a target captured in first background light, generating, on a basis of the first image data, first spectral data indicating an estimated spectrum of the first background light, and generating, from the first image data, at least one piece of second image data indicating at least one image of the target in at least one type of second background light, which is different from the first background light, using at least one piece of second spectral data indicating at least one spectrum of the at least one type of second background light and the first spectral data.

According to this aspect of the present disclosure, color reproducibility of an image to be provided for a user can be improved.

It should be noted that general or specific aspects of the present disclosure may be implemented as a system, an apparatus, a method, an integrated circuit, a computer program, a computer-readable storage medium such as a storage disc, or any selective combination thereof. The computer-readable storage medium may be a volatile storage medium or a nonvolatile storage medium such as a compact disc read-only memory (CD-ROM). The apparatus may include one or more apparatuses. When the apparatus includes two or more apparatuses, the two or more apparatuses may be provided in a single device or two or more separate devices. An "apparatus" herein and in the claims can refer to not only a single apparatus but also a system including two or more apparatuses.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating an image of data in a database of spectra of sunlight stored in a memory;

DETAILED DESCRIPTION

Figure 1:
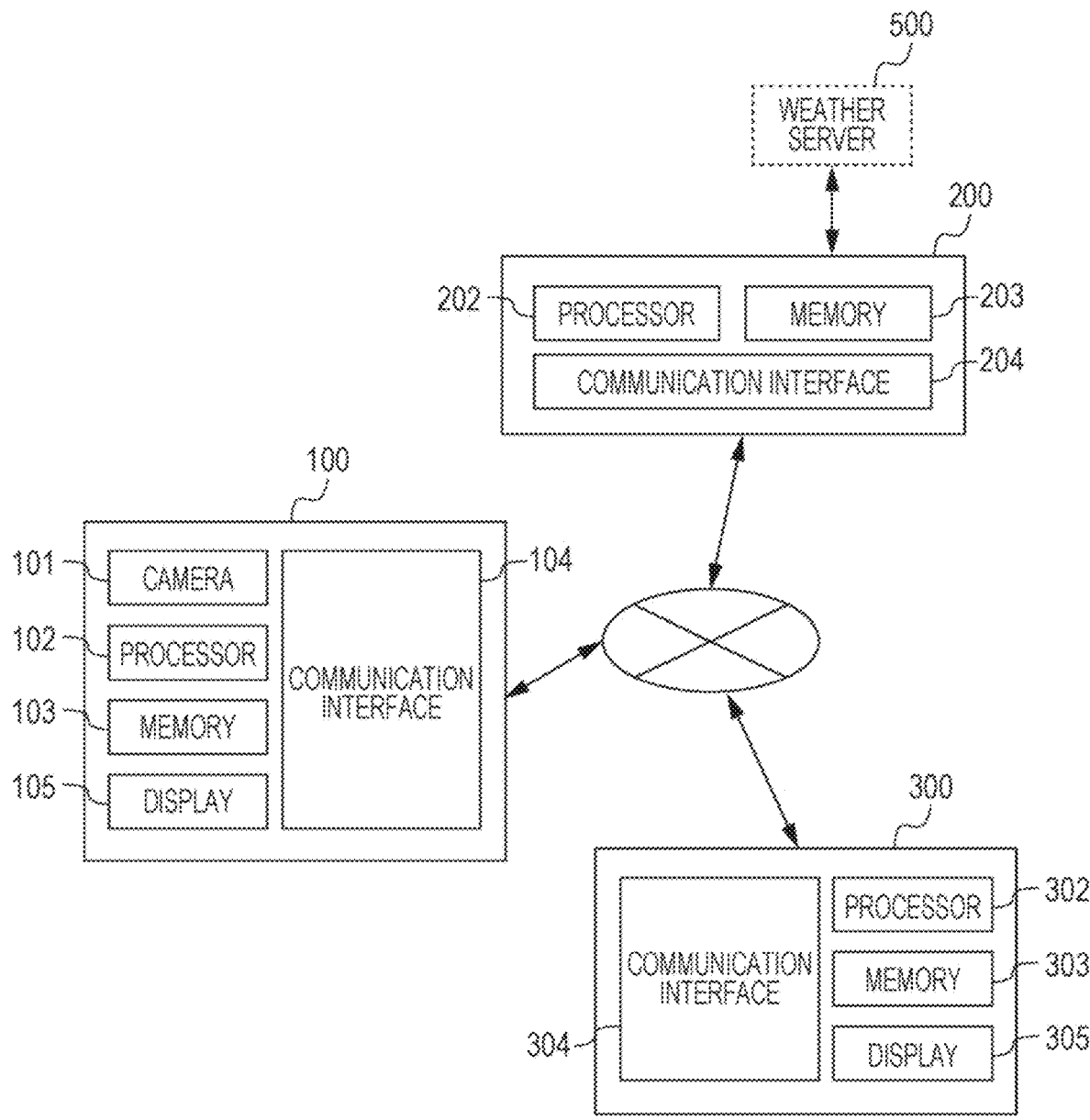
FIG. 1 is a diagram illustrating the configuration of a system according to an exemplary embodiment.

In the present disclosure, some or all of circuits, units, apparatuses, members, or parts or some or all of function blocks in block diagrams can be achieved, for example, by one or more electronic circuits including a semiconductor device, a semiconductor integrated circuit (IC), or a large-scale integration (LSI) circuit. The LSI circuit or the IC may be integrated on a single chip, or may be achieved by combining chips together. For example, function blocks other than a storage device may be integrated on a single chip. Although terms "LSI" and "IC" are used here, other terms may be used depending on a degree of integration. Terms such as "system LSI", "very-large-scale integration (VLSI)", and "ultra-large-scale integration (ULSI)" may be used, instead. A field-programmable gate array (FPGA), which is programmed after an LSI circuit is fabricated, or a reconfigurable logic device, with which connection relationships in an LSI circuit can be reconfigured or circuit sections in an LSI circuit can be set up, can also be used for the same purposes.

Furthermore, functions or operations of some or all of the circuits, the units, the apparatuses, the members, or the parts can be achieved through software processing. In this case, software is stored in one or more non-transitory storage media such as read-only memories (ROMs), optical discs, or hard disk drives. When a processor executes the software, functions specified by the software are executed by the processor and peripheral devices. A system or an apparatus may include the one or more non-transitory storage media storing the software, the processor, and a necessary hardware device such as an interface.

An outline of aspects of the present disclosure will be described before describing a specific embodiment of the present disclosure.

A method for processing image data according to an exemplary aspect of the present disclosure includes:

(1) obtaining first image data indicating a hyperspectral image of a target captured in first background light;

(2) generating, on a basis of the first image data, first spectral data indicating an estimated spectrum of the first background light; and (3) generating, from the first image data, at least one piece of second image data indicating at least one image of the target in at least one type of second background light, which is different from the first background light, using at least one piece of second spectral data indicating at least one spectrum of the at least one type of second background light and the first spectral data.

A "hyperspectral image" refers to an image including, for each pixel, information four or more wavelength ranges. A hyperspectral image can be obtained by, for example, a hyperspectral camera capable of obtaining information regarding four or more wavelength ranges for each pixel.

With this configuration, first image data indicating an image of a target in first background light can be converted into second image data indicating an image of the target in second background light. As a result, color reproducibility of an image of an article that is the target can be improved. With this configuration, in particular, first spectral data indicating an estimated spectrum of the first background light is generated on the basis of the first image data. As a result, unlike in techniques in examples of the related art, even if a spectrum of the first background light at a time when an article has been captured is unknown, an image of the article in second background light can be generated.

In another aspect, the at least one type of second background light may include different types of second background light. The at least one piece of second image data may include pieces of second image data. Each of the pieces of second image data may indicate a corresponding one of the at least one image of the target in a corresponding one of the different types of second background light.

With this configuration, images of a target in different types of second background light can be generated.

The different types of second background light may include sunlight and one or more types of artificial light.

With this configuration, images of a target in sunlight and one or more types of artificial light can be generated.

The generating at least one piece of second image data may include generating, from the first image data using the first spectral image, reflection spectral data indicating a reflection spectrum of the target and generating the at least one piece of second image data using the reflection spectral data and the at least one piece of second spectral data.

The generating first spectral data may include determining, on a basis of the first image data, whether the hyperspectral image has been captured outdoors or indoors and generating the first spectral data through different processes in accordance with whether the hyperspectral image has been captured outdoors or indoors.

With these configurations, second image data can be generated through an appropriate process in accordance with whether a hyperspectral image of a target has been captured outdoors or indoors.

If it is determined, in the determining, that the hyperspectral image has been captured outdoors, the generating first spectral data may further include obtaining data indicating at least one selected from the group consisting of a date, a time, a position, and weather at a time when the hyperspectral image has been captured, obtaining spectral data regarding sunlight associated with the at least one selected from the group consisting of a date, a time, a position, and weather, and storing the spectral data regarding the sunlight in a storage medium as the first spectral data.

With this configuration, if a hyperspectral image of a target has been captured outdoors, more appropriate second image data can be generated.

If it is determined, in the determining, that the hyperspectral image has been captured indoors, the generating first spectral data may further include estimating a type of artificial light to which the first background light belongs on a basis of spectral data regarding at least one preset reference wavelength range, the spectral data being extracted from the first image data and storing spectral data regarding the type of artificial light in a storage medium as the first spectral data.

With this configuration, if a hyperspectral image of a target has been captured indoors, more appropriate second image data can be generated.

The at least one reference wavelength range may include a wavelength range corresponding to blue and a wavelength range corresponding to green.

With this configuration, spectral data regarding artificial light can be generated more accurately.

The at least one reference wavelength range may include a wavelength range corresponding to blue, a wavelength range corresponding to green, and a wavelength range corresponding to red.

With this configuration, spectral data regarding artificial light can be generated more accurately.

The method for processing image data may be executed by a server computer that provides, over a network, a website for selling the target as a product. The method may further include transmitting, to a user terminal used by a user of the website in response to a request from the user terminal, data regarding a web page including the at least one piece of second image data.

A method for processing image data according to another exemplary aspect of the present disclosure is executed by a server computer that provides a website for selling a product over a network. The method includes obtaining first image data indicating a hyperspectral image of a first product captured in first background light, generating, on a basis of the first image data, first spectral data indicating an estimated spectrum of the first background light, generating, from the first image data, at least one piece of second image data indicating at least one image of the first product in at least one type of second background light, which is different from the first background light, using at least one piece of second spectral data indicating at least one spectrum of the at least one type of second background light and the first spectral data, and transmitting, to a user terminal used by a user of the website in response to a request from the user terminal, data regarding a web page including the at least one piece of second image data.

With this configuration, an image of a product such as a fashion item sold in electronic commerce can be appropriately processed and displayed on a user terminal. In electronic commerce, a photograph of a product displayed on a web page and an actual product might give different impressions, if a spectrum of artificial light used to capture an image of a product and a spectrum of background light in an environment in which a user who has purchased the product uses the product are significantly different from each other, for example, impressions of the photograph and the actual product can be significantly different from each other. With this configuration, the user can check how a product looks in a desired type of background light before purchasing the product. Even if a spectrum of background light at a time when an image of the product has been captured is unknown, an image of the product in a type of background light selected by the user can be displayed. As a result, a level of satisfaction of the user increases.

The obtaining first image data may include receiving the first image data from a seller terminal used by a seller of the first product. The method may further include transmitting, after generating the at least one piece of second image data, a request for obtaining an approval for the at least one piece of second image data to the seller terminal and receiving, from the seller terminal, data indicating that the at least one piece of second image data has been approved. The transmitting data regarding a web page to a user terminal may be performed after the data indicating that the at least one piece of second image data has been approved is received.

With this configuration, a seller of a product can check validity of second image data after the second image data is generated. The second image data is used on a web page only if the seller gives approval. As a result, for example, posting of inappropriate second image data on a web page can be avoided.

The transmitting data regarding a web page to a user terminal may include transmitting, to the user terminal in response to a first request from the user terminal, data regarding a first web page including default image data regarding the first product and transmitting, to the user terminal in response to a second request from the user terminal, data regarding a second web page, which is obtained by replacing the default image data on the first web page with the at least one piece of second image data or adding the at least one piece of second image data to the default image data on the first web page.

With this configuration, if a user who is viewing a first web page requests display of an image of a product in second background light, that is, a second image, a second web page including the second image can be displayed.

The at least one type of second background light may include types of second background light. The first web page may include a display area for allowing the user to select one of scenes associated in one-to-one correspondence with the types of second background light.

With this configuration, by selecting one of the scenes, the user can check images captured in types of second background light associated with the selected scene.

The display area may include areas indicating the scenes in one-to-one correspondence. In the display area, the areas may be displayed in order according to a number of times that each of the scenes has been selected on the website in past.

With this configuration, a convenient website in which scenes that have been selected most often for a product are displayed first, for example, can be displayed.

The method may further include receiving, in a case where one of the scenes is selected, the second request. The second web page may further include image data regarding at least one second product determined on a basis of a number of times that the at least one second product has been displayed along with the selected scene. Alternatively, the second web page may further include image data indicating at least one second product in, among the types of second background light, a type of second background light associated with the selected scene.

With this configuration, an image of another product that can draw the user's interest can be displayed on the second web page. As a result, the user can find another product that matches the scene selected thereby.

The obtaining first image data may include receiving the first image data from a seller terminal used by a seller of the first product. The generating first spectral data may include determining, on a basis of spectral data regarding at least one preset reference wavelength range, the spectral data being extracted from the first image data, whether the first background light is identifiable and transmitting, if the first background light is not identifiable, instruction data for prompting the seller to capture another hyperspectral image of the product in background light different from the first background light.

With this configuration, if the first background light is not identifiable, the seller can be notified that the first background light is not identifiable and prompted to create the first image data again.

The at least one reference wavelength range may include a wavelength range corresponding to blue. If an amount of data regarding a component in the wavelength range corresponding to blue included in the spectral data regarding the at least one reference wavelength range is smaller than a reference value, the determining may include determining that the first background light is not identifiable.

The first product may be a fashion item. The product is not limited to a fashion item, and may be any kind of product such as a piece of furniture, an automobile, or an electrical appliance.

The present disclosure also includes an image data processing apparatus including a computer that executes the method in one of the above-described configurations and a computer program for causing a computer to execute the method in one of the above-described configurations.

A computer-readable storage medium according to another aspect of the present disclosure is a computer-readable storage medium storing a program for processing image data. When executed by a computer, the program causes the computer to perform a process including obtaining first image data indicating a hyperspectral image of a target captured in first background light, generating, on a basis of the first image data, first spectral data indicating an estimated spectrum of the first background light, and generating, from the first image data, at least one piece of second image data indicating at least one image of the target in at least one type of second background light, which is different from the first background light, using at least one piece of second spectral data indicating at least one spectrum of the at least one type of second background light and the first spectral data.

A computer-readable storage medium according to another aspect of the present disclosure is a computer-readable storage medium storing a program for processing image data. When executed by a computer, the program causes the computer to perform a process including obtaining first image data indicating a hyperspectral image of a first product captured in first background light, generating, on a basis of the first image data, first spectral data indicating an estimated spectrum of the first background light, generating, from the first image data, at least one piece of second image data indicating at least one image of the first product in at least one type of second background light, which is different from the first background light, using at least one piece of second spectral data indicating at least one spectrum of the at least one type of second background light and the first spectral data, and transmitting, to a user terminal used by a user of a website in response to a request from the user terminal, data regarding a web page including the at least one piece of second image data.

An image data processing system according to another aspect of the present disclosure includes an image processing computer and a server computer that provides a website for selling a product over a network. The image processing computer obtains first image data indicating a hyperspectral image of the product captured in first background light, generates, on a basis of the first image data, first spectral data indicating an estimated spectrum of the first background light, and generates, from the first image data, at least one piece of second image data indicating at least one image of the product in at least one type of second background light, which is different from the first background light, using at least one piece of second spectral data indicating at least one spectrum of the at least one type of second background light and the first spectral data. The server computer transmits, to a user terminal used by a user of the website in response to a request from the user terminal, data regarding a web page including the at least one piece of second image data.

With these configurations, the service described above can be provided when an image processing computer that converts first image data into second image data and a server computer that transmits data regarding a web page to a user terminal are different from each other.

An embodiment of the present disclosure will be specifically described hereinafter. The embodiment that will be described hereinafter is a general or specific example. Values, shapes, components, arrangement positions and connection modes of the components, steps, order of the steps, and the like mentioned in the following embodiment are examples, and do not limit the present disclosure. Among the components in the following embodiment, ones not described independent claims, which define broadest concepts, will be described as optional components. The drawings are schematic diagrams and not necessarily strict illustrations. In each of the drawings, essentially the same or similar components are given the same reference numerals, and redundant description thereof might be omitted or simplified.

First Embodiment

FIG. 1 is a diagram illustrating the configuration of a system according to a first embodiment. The system includes a seller terminal 100, a server 200, which is a server computer, and a user terminal 300. The server 200 is connected to the seller terminal 100 and the user terminal 300 over a network such as the Internet. The server 200 is also connected to a weather server 500 over the Internet or another network.

The server 200 has a function as a data processing apparatus that executes the method for processing image data in the present disclosure. The server 200 functions as a web server that generates data regarding a website for selling products such as fashion items or furniture. The fashion items may include, for example, clothes, shoes, bags, wallets, accessories, watches, and other fashion accessories.

The server 200 includes a processor 202, a memory 203, and a communication interface 204. The processor 202 executes a computer program stored in the memory 203 to execute a process that will be described later. The server 200 generates data regarding a website in response to a request from the user terminal 300 and provides the data for the user terminal 300.

The seller terminal 100 is a computer used by a seller who sells products posted on a website provided by the server 200. The seller may be a company, a store, or an individual. When the server 200 provides a web service such as a flea market site or an auction site, for example, the seller can be an individual. A business operator who provides the web service may be the seller.

The seller terminal 100 can be a computer such as a smartphone, a tablet computer, or a personal computer. The seller terminal 100 according to the present embodiment includes a camera 101, which is a hyperspectral camera, a processor 102, a memory 103, a communication interface 104, and a display 105. The camera 101 is incorporated into the seller terminal 100 in the present embodiment, but may be a component external to the seller terminal 100, instead.

The camera 101 is an imaging device capable of obtaining a hyperspectral image. A hyperspectral image includes information regarding wavelength ranges more than three common wavelength ranges of red, green, and blue. An example of a hyperspectral image is an image including information regarding wavelength ranges of four or more wavelength bands, Another example of a hyperspectral image is an image including information regarding wavelength ranges of 10 or more wavelength bands. A wavelength range of visible light is 380 to 750 nm, a wavelength range of blue is 380 to 500 nm, a wavelength range of green is 500 to 600 nm, and a wavelength range of red is 600 to 750 nm herein.

Figure 2A:
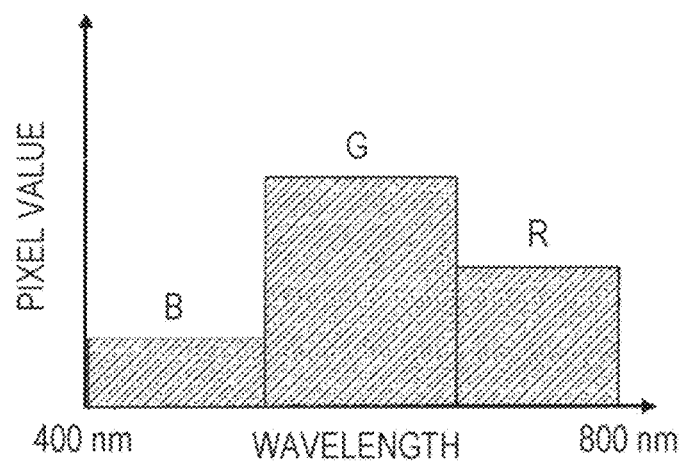
FIG. 2A is a diagram illustrating an example of data regarding a pixel in an image including only information regarding three common wavelength ranges of red, green, and blue.
Figure 2B:
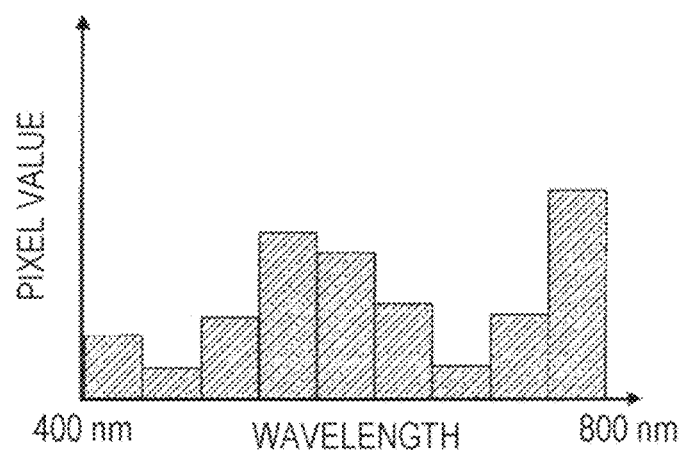
FIG. 2B is a diagram illustrating an example of data regarding a pixel in a hyperspectral image in which the wavelength ranges of red, green, and blue are each divided into three.
Figure 2C:
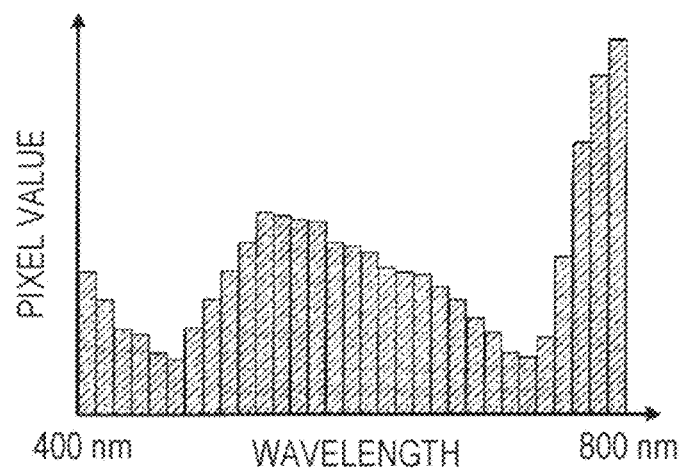
FIG. 2C is a diagram illustrating an example of a hyperspectral image in which the wavelength ranges of red, green, and blue are each divided more finely.

FIG. 2A is a diagram illustrating an example of data regarding a pixel in an image including only information regarding the three common wavelength ranges of red (R), green (G), and blue (B). FIG. 2B is a diagram illustrating an example of data regarding a pixel in a hyperspectral image in which the wavelength ranges of red, green, and blue are each divided into three. FIG. 2C is a diagram illustrating an example of a hyperspectral image in which the wavelength ranges of red, green, and blue are each divided more finely. The camera 101 according to the present embodiment obtains a hyperspectral image in which each of pixels has data such as that illustrated in FIG. 2B or 2C, The camera 101 can include, for each pixel, a hyperspectral image sensor capable of obtaining data regarding four or more wavelength ranges within the wavelength range of visible light and an optical system including one or more lenses.

The processor 102 controls the operation of the seller terminal 100 by executing a program stored in the memory 103. The processor 102 transmits, for example, data regarding a hyperspectral image of a product captured by the camera 101 to the server 200 through the communication interface 104. The processor 102 also displays, on the display 105, an image of an application for uploading the data regarding the hyperspectral image.

Data regarding a hyperspectral image can include data regarding a timestamp indicating a date and a time of capture. The seller terminal 100 can include a global positioning system (GPS) receiver. The seller terminal 100 may include, in data to be uploaded, data indicating a position (e.g., latitude and/or longitude) measured by the GPS receiver. The data regarding the time of capture and the position can be used by the server 200 to estimate a spectrum of sunlight when a hyperspectral image has been captured outdoors.

The user terminal 300 is a computer used by a user who purchases a product posted on the website provided by the server 200. There are a large number of users and a large number of user terminals 300 in practice, but FIG. 1 illustrates only one of such user terminals 300. The user terminal 300 can be a computer such as a smartphone, a tablet computer, or a personal computer. The user terminal 300 includes a processor 302, a memory 303, a communication interface 304, and a display 305.

The processor 302 executes a program stored in the memory 303 to control the operation of the user terminal 300. The processor 302 requests data regarding a web page from the server 200 in accordance with an operation performed by the user. The processor 302 displays an image based on the data obtained from the server 200 on the display 305.

The weather server 500 records weather data in various places at various times. The server 200 can obtain, from the weather server 500, weather data corresponding to a time and a place at which a hyperspectral image has been generated.

Figure 3:
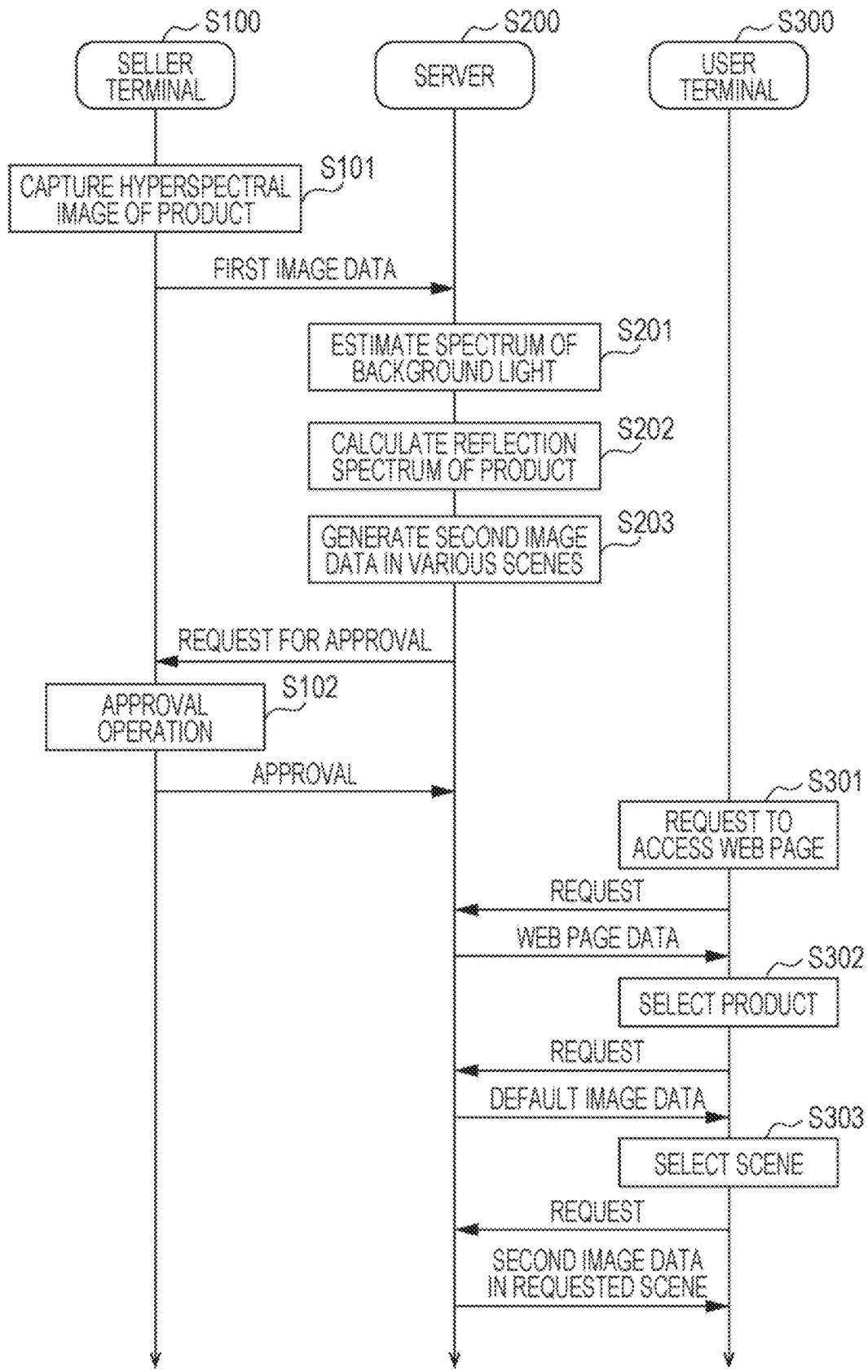
FIG. 3 is a sequence diagram illustrating an example of the operation of a seller terminal; a server; and a user terminal and data flow.

FIG. 3 is a sequence diagram illustrating an example of the operation of the seller terminal 100, the server 200, and the user terminal 300 and data flow. An outline of the operation of the system according to the present embodiment will be described with reference to FIG. 3.

The seller generates a hyperspectral image of a product to be sold using the camera 101, which is a hyperspectral camera (step S101). The seller uploads data regarding the hyperspectral image using the seller terminal 100. This image data will be referred to as "first image data". Background light in an environment where the hyperspectral camera of the product has been captured will be referred to as "first background light". The first background light may be artificial light or sunlight.

The server 200 obtains the uploaded first image data. The server 200 estimates a spectrum of the first background light on the basis of the first image data (step S201). A specific example of an operation for estimating the spectrum of the first background light will be described later. The server 200 generates first spectral data indicating the estimated spectrum of the first background light. The server 200 stores the generated first spectral data in a storage medium such as the memory 203.

Next, the server 200 generates data regarding a reflection spectrum of the product from the first image data using the first spectral data (step S202). Reflection spectral data regarding the product can be generated, for example, by dividing a value of each pixel in the first image data at each wavelength by a value in the first spectral data at the wavelength.

Next, the server 200 generates second image data indicating one or more images of the product in one or more types of virtual background light using the reflection spectral data and spectral data regarding the one or more types of virtual background light stored in advance in the storage medium such as the memory 203 (step S203). The virtual background light will be referred to as "second background light", and the spectral data regarding the virtual background light will be referred to as "second spectral data". Here, the virtual background light refers to background light associated with scenes that can be selected by a user who purchases the product on the website provided by the server 200. The selectable scenes can include, for example, outdoor (day), outdoor (evening), indoor (warm color LED), indoor (day white LED), and indoor (fluorescent). The virtual background light, therefore, can include, for example, sunlight, LED light, fluorescent light, and incandescent light.

After generating the second image data corresponding to various scenes, the server 200 transmits, to the seller terminal 100, a request to obtain an approval for each piece of the second image data. Upon receiving the request, the seller terminal 100 displays, on the display 105, images based on the second image data and an image for allowing the seller to select whether to approve each piece of the second image data. These images may be displayed immediately or some time after the hyperspectral image is uploaded. The seller performs an approval operation for each piece of the second image data corresponding to the various scenes in accordance with an instruction in the displayed image (step S102). If the seller approves each piece of the second image data, the seller terminal 100 transmits, to the server 200, data indicating that the seller has approved the piece of the second image data. Upon receiving the data, the server 200 posts the product on a sales web page and starts to sell the product.

The user can now purchase the product. If the user makes a request to access the sales web page for the product (step S301), the server 200 transmits data regarding the web page to the user terminal 300. If the user selects the product on the user terminal 300 (step S302), the server 200 transmits data regarding a web page including default image data regarding the product. The default image data may be, for example, the first image data uploaded by the seller terminal 100 or data obtained by processing the first image data. The display 305 of the user terminal 300 can display an image for allowing the user to select one of the scenes along with the image of the product. If the user selects one of the scenes (step S303), the user terminal 300 requests, from the server 200, data regarding a web page including image data associated with the selected scene. In response to the request, the server 200 transmits data regarding a web page on which the default image data has been replaced by the second image data corresponding to the selected scene. Alternatively, the server 200 transmits data regarding a web page on which the second image data corresponding to the selected scene has been added to the default image data. Upon receiving the data, the user terminal 300 displays an image of the selected scene on the display 305.

Figure 4:
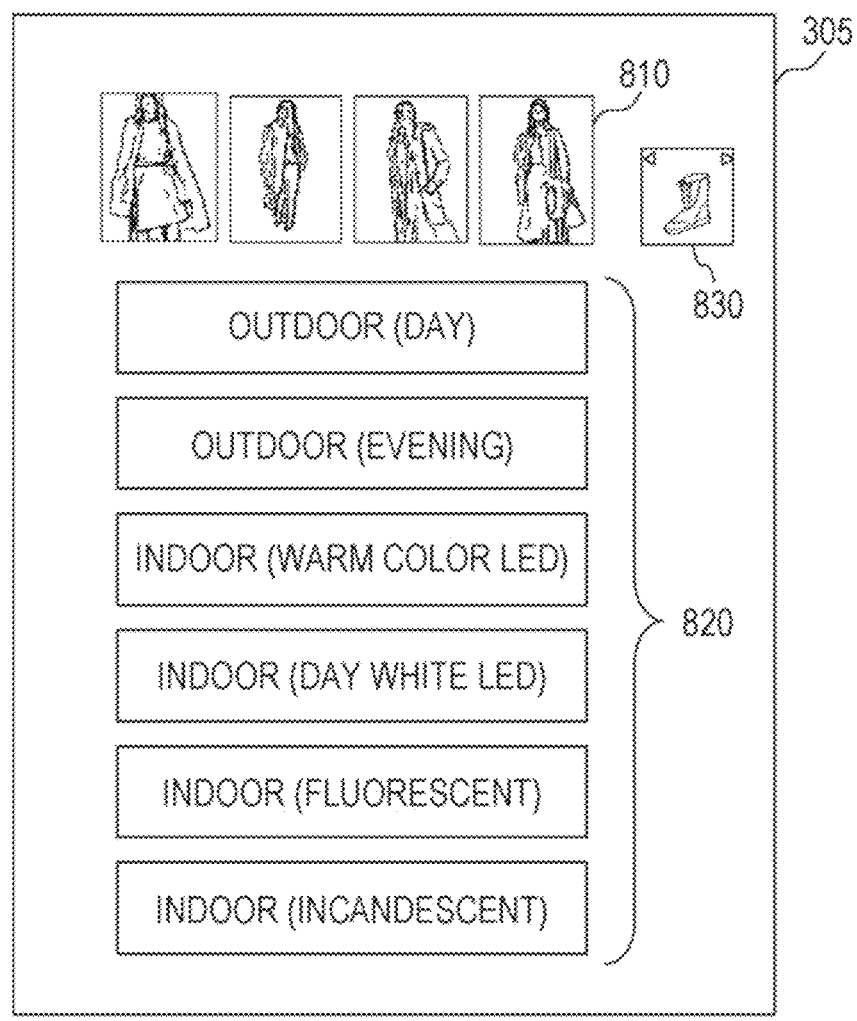
FIG. 4 is a diagram illustrating an example of a web page displayed on the user terminal.

FIG. 4 is a diagram illustrating an example of a web page displayed on the user terminal 300. The web page in this example includes images 810 indicating examples of styling of a product selected by the user and a display area 820 for selectable scenes. The scenes in this example include outdoor (day), outdoor (evening), indoor (warm color LED), indoor (day white LED), indoor (fluorescent), and indoor (incandescent). If the user selects one of the scenes, the images 810 change in accordance with the selected scene. The layout of the web page and items displayed on the web page are not limited to the illustrated example. For example, the scenes need not be indicated by text and may be displayed as thumbnails, instead. The scenes can be set, for example, in terms of time and place. In addition to the scenes illustrated in FIG. 4, scenes such as outdoor (night) and party may be selectable. Depending on the selected scene, not only coloring of the images 810 but also backgrounds of the images 810 may change. When image data regarding backgrounds and image data regarding persons who wear the product are separately stored, combinations of the backgrounds and the persons can be change as desired.

The server 200 may change order of the scenes in the display area 820 in accordance with the selected product. For example, the scenes may be displayed in order according to the number of times that each of the scenes has been selected on the website by users for the product. Scenes that have been selected most often for the product may be displayed first, or second image data associated with a scene that has been selected most often may be displayed as a default. In this case, the user can understand a combination of popular scenes and the product.

Data regarding a web page transmitted by the server 200 if the user selects one of the scenes may further include at least one other product. For example, an image of the at least one other product in a type of virtual background light corresponding to the selected scene may be added. The at least one other product may be a product selected by the user in the past or determined from an Internet search history of the user. Alternatively, the at least one other product may be determined on the basis of the number of times that the at least one other product has been displayed along with the selected scene. For example, the data regarding the web page may include image data regarding one or more other products that have been displayed most often along with the selected scene. Such images of other products can be displayed, like an image 830 illustrated in FIG. 4, for example, at a side or a bottom of a screen as recommendations. In this case, the user can easily understand other popular products that match the selected scene. In the example illustrated in FIG. 4, only one image 830 is displayed for other products; and if the user presses one of triangles displayed in upper-left and upper-right corners of the image 830, the image 830 switches to an image of another recommended product. Alternatively, for example, images of other products may be simultaneously displayed on the same screen.

Although the server 200 transmits a request to obtain approvals for the second image data corresponding to various scenes to the seller terminal 100 after generating the second image data in the example illustrated in FIG. 3, this process may be omitted, instead. In this case, the second image data generated in step S203 is used as images to be posted on the website. In this example, the server 200 generates the second image data in step S203 before posting the images on the website. Alternatively, the server 200 may generate the second image data after the user selects one of the scenes in step S303.

Next, the operation of the server 200 according to the present embodiment will be described more specifically.

Figure 5:
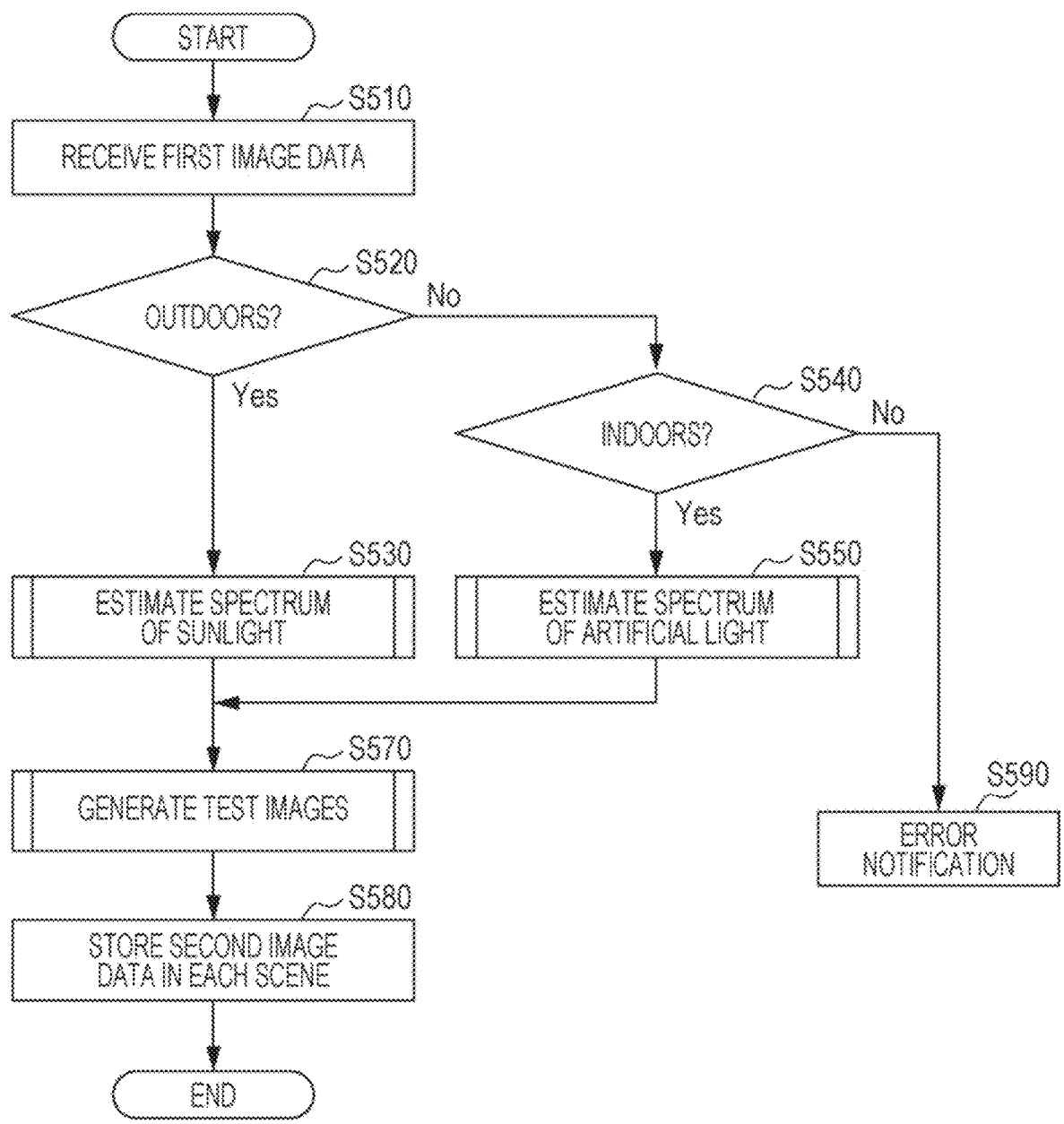
FIG. 5 is a flowchart illustrating an example of operations performed by a processor of the server.

FIG. 5 is a flowchart illustrating an example of operations performed by the processor 202 of the server 200. The server 200 in this example performs steps S510 to S590 illustrated in FIG. 5. An operation performed in each of the steps will be described hereinafter.

In step S510, the server 200 receives, from the seller terminal 100, first image data indicating a hyperspectral image of a product captured in first background light.

Next, the server 200 determines, on the basis of the received first image data, whether the hyperspectral image of the product has been captured outdoors or indoors. The server 200 estimates spectral data regarding the first background light through different processes in accordance with whether the hyperspectral image of the product has been captured indoors or outdoors. In the example illustrated in FIG. 5, the server 200 first determines, in step S520, whether the hyperspectral image of the product has been captured outdoors on the basis of the first image data. If a result of the determination is Yes, the process proceeds to step S530. If the result of the determination is No, the process proceeds to step S540, and the server 200 determines, on the basis of the first image data, whether the hyperspectral image of the product has been captured indoors. If a result of the determination is Yes, the process proceeds to step S550. If the result of the determination is No, the process proceeds to step S590.

Figure 6:
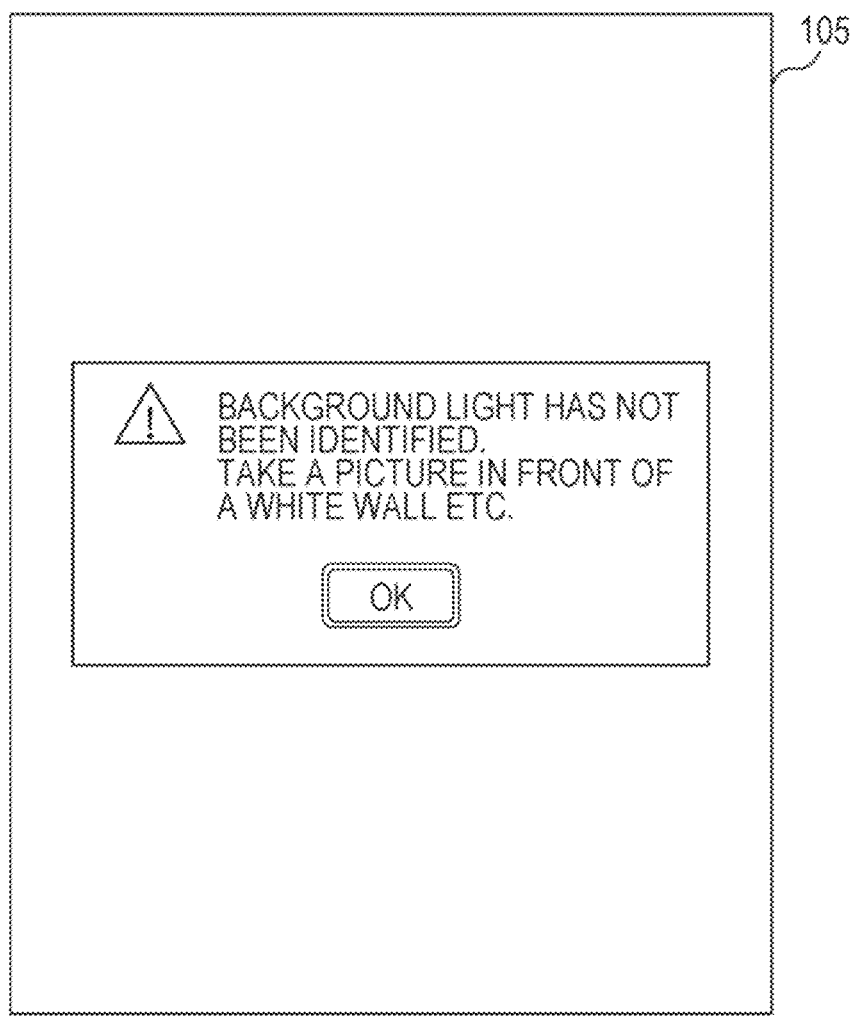
FIG. 6 is a diagram illustrating an example of an image displayed on the seller terminal.

In step S590, the server 200 transmits, to the seller terminal 100, an error notification indicating that a capture environment has not been identified. In addition to the error notification, the server 200 may also transmit, to the seller terminal 100, instruction data for prompting the seller to capture another hyperspectral image of the product in a different environment. Upon receiving the instruction data, the seller terminal 100 displays, on the display 105, an image for prompting the user to capture another hyperspectral image of the product in a different environment. As illustrated in FIG. 6, a message, "Background light has not been identified. Take a picture again in front of a white wall etc.", for example, can be displayed. Alternatively, a message for prompting the user to simply capture a hyperspectral image again or change a place where the user captures a hyperspectral image may be displayed.

In steps S520 and S540, whether the hyperspectral image of the product has been captured outdoors or indoors can be determined from the first image data using a certain image recognition algorithm. If an outdoor object such as the sky, a cloud, a tree, a building, a vehicle, a street, a mountain, or a river is detected in the hyperspectral image, for example, it can be determined that the hyperspectral image has been captured outdoors. If an indoor object such as a wall, an electrical appliance, a carpet, or a piece of furniture is detected in the hyperspectral image, it can be determined that the hyperspectral image has been captured indoors. In addition, whether the hyperspectral image has been captured outdoors can be estimated from overall brightness and/or tone of the hyperspectral image. The server 200 can determine whether the hyperspectral image has been captured outdoors or indoors on the basis of these various factors. Alternatively, whether the hyperspectral image has been captured outdoors or indoors may be determined using, for example, a model trained with a machine learning algorithm for the first image data.

If determining that the hyperspectral image has been captured outdoors, the server 200 performs, in step S530, a process for estimating a spectrum of sunlight, which is background light. If determining that the hyperspectral image has been captured indoors, on the other hand, the server 200 performs, in step 3550, a process for estimating a spectrum of artificial light, which is background light.

Figure 7:
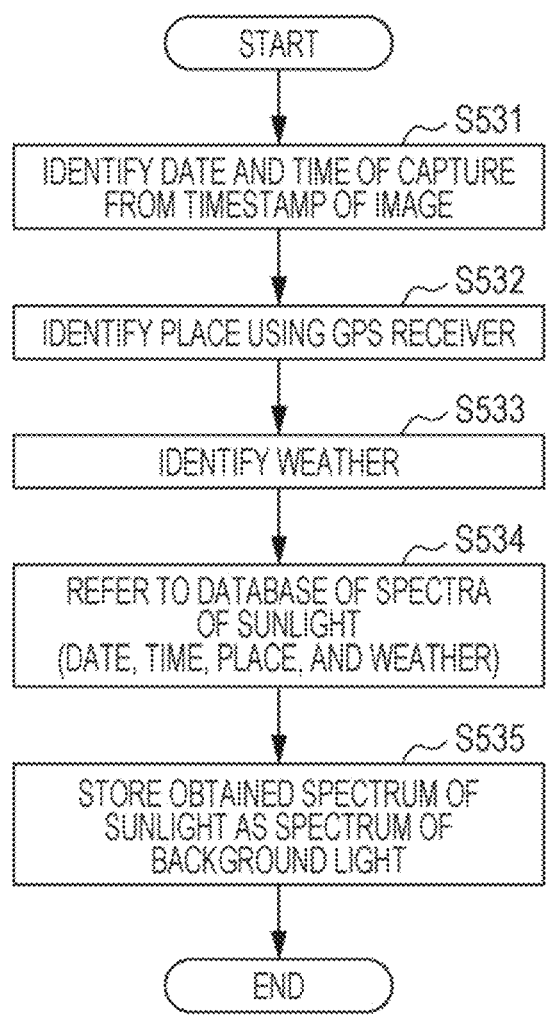
FIG. 7 is a flowchart illustrating a specific example of a process for estimating a spectrum of sunlight in step S530.

FIG. 7 is a flowchart illustrating a specific example of the process for estimating a spectrum of sunlight in step S530 Step S530 includes steps S531 to 3535 illustrated in FIG. 7.

In step S531, the server 200 identifies a date and a time of capture from a timestamp of an uploaded hyperspectral image. In step S532, the server 200 identifies a place of capture from positional data obtained by the GPS receiver. In step S533, the server 200 accesses the weather server 500 and identifies weather in the place of capture at the date and the time of capture. Order of steps 3531 to S533 may be changed. In step S534, the server 200 refers to a database stored in the memory 203 in advance and obtains data regarding a spectrum of sunlight corresponding to the identified date, time, place, and weather. In step S535, the server 200 stores the obtained data regarding a spectrum of sunlight in the memory 203 as an estimated spectrum of background light.

FIG. 8 is a diagram illustrating an image of data in the database of spectra of sunlight stored in the memory 203. In the database in this example, a combination of a date and a time of capture, a place, and weather is associated with data regarding a spectrum of sunlight. This kind of data is stored in the memory 203 or another storage medium in advance. By referring to such a database, the server 200 can obtain data regarding a spectrum of sunlight corresponding to a date and a time of capture, a place of capture, and weather. Although FIG. 8 illustrates spectral data as a graph in order to facilitate understanding, data indicating intensity at each wavelength is stored in practice. Although data is stored for cities in FIG. 8, data may be stored for smaller areas of the cities, instead.

Figure 9:
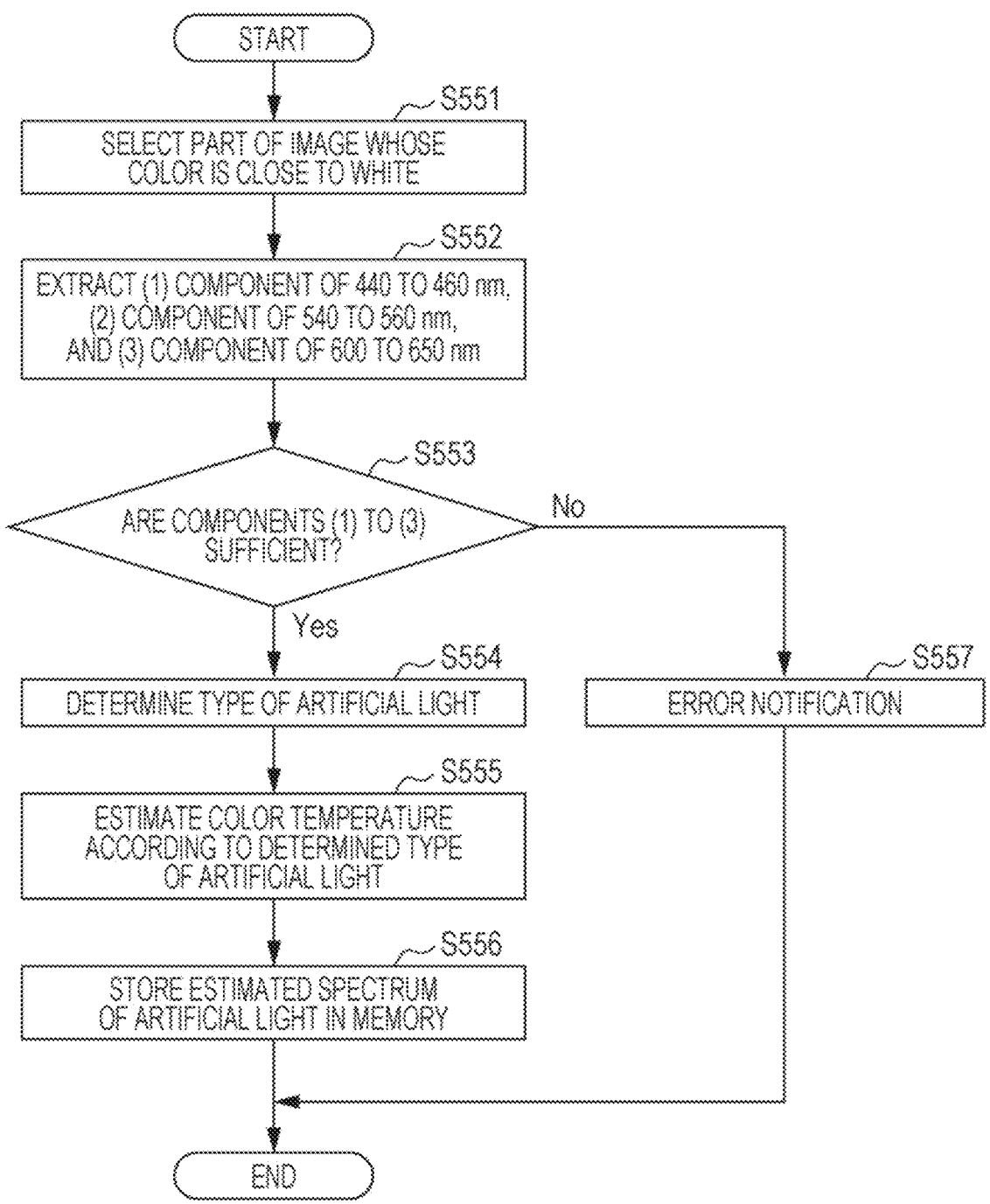
FIG. 9 is a flowchart illustrating a specific example of a process for estimating a spectrum of artificial light in step S550.

FIG. 9 is a flowchart illustrating a specific example of the process for estimating a spectrum of artificial light in step S550. Step S550 includes steps S551 to S557 illustrated in FIG. 9. A spectrum of artificial light, which is indoor background light, can be estimated by extracting features from a spectrum of an object or a background in an image.

In step S551, the server 200 selects a part of an obtained hyperspectral image whose color is estimated to be close to white. A part of a background or an object whose color is estimated to be close to white, for example, can be selected. Whether a color is close to white can be determined, for example, on the basis of a ratio of components in the three wavelength ranges of red, green, and blue. Because reflectance of blue and green components is extremely low on a red object, for example, the amount of information is not large enough to estimate a spectrum of artificial light. With an area whose reflection spectral component is not zero from 400 to 700 nm, within which humans have a luminous efficiency function, on the other hand, a sufficient amount of information for estimating a spectrum of artificial light can be obtained. A spectrum of artificial light can be accurately estimated especially with a target whose reflectance hardly varies throughout a visible range.

In step S552, the server 200 extracts (1) a component of 440 to 460 nm, (2) a component of 540 to 560 nm, and (3) a component of 600 to 650 nm from data regarding one or more pixels in the selected area. These three wavelength ranges will be referred to as "reference wavelength ranges" hereinafter.

In step S553, the server 200 determines whether there is sufficient amount of data regarding components in all the three reference wavelength ranges. For example, the server 200 determines whether an average of values of pixels included in the area selected in step S551 exceeds a certain threshold in every reference wavelength range. If a result of the determination is Yes, the process proceeds to step S554. If the result of the determination is No, the process proceeds to step S557.

Step S557 is the same as the above-described step S590. In step S557, the server 200 transmits, to the seller terminal 100, a notification indicating that background light has not been identified. The server 200 may also transmit, to the seller terminal 100, instruction data for prompting the seller to change a background image. For example, the server 200 may transmit, to the seller terminal 100, instruction data for prompting the seller to capture another hyperspectral image of the product in a different environment. Upon receiving the instruction data, the seller terminal 100 displays, on the display 105, an image for prompting the seller to capture another hyperspectral image of the product in a different environment. The message illustrated in FIG. 6, for example, may be displayed on the display 105. Alternatively, a message for prompting the user to simply capture a hyperspectral image again or change a place where the user captures a hyperspectral image may be displayed.

If there is a sufficient amount of data regarding all the components (1) to (3), the process proceeds to step S554. The server 200 refers to spectral data regarding different types of artificial light stored in the memory 203 and determines a type of artificial light. Because a spectrum of artificial light includes a unique feature according to a method for emitting light employed by a lighting device, a type of artificial light can be identified by recognizing a feature in hyperspectral data. The server 200 also estimates, in step S555, a color temperature according to the identified type of artificial light. Details of this process will be described hereinafter.

The memory 203 stores in advance spectral data regarding different types of artificial light. The types of artificial light include, for example, LED light, fluorescent light, and incandescent light. Because a spectrum includes a unique feature according to an employed method for emitting light, common spectral data may be stored for each of the different types of artificial light. Alternatively, data regarding different lighting devices may be prepared on the basis of models provided by manufacturers for each of the types of artificial light.

Figure 10A:
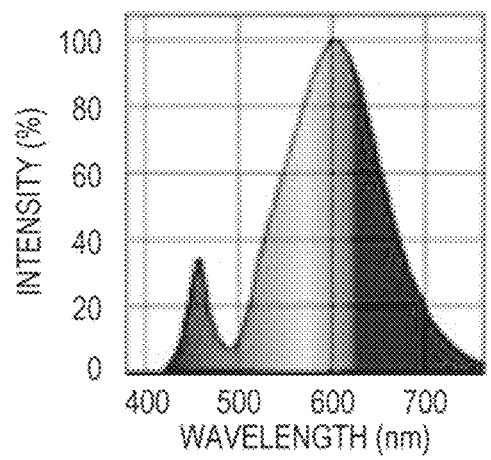
FIG. 10A is a diagram illustrating an example of spectral data regarding an light-emitting diode (LED) lamp.
Figure 10B:
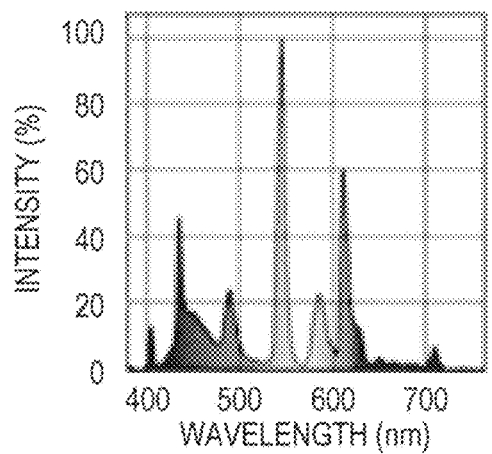
FIG. 10B is a diagram illustrating an example of spectral data regarding a fluorescent lamp.
Figure 10C:
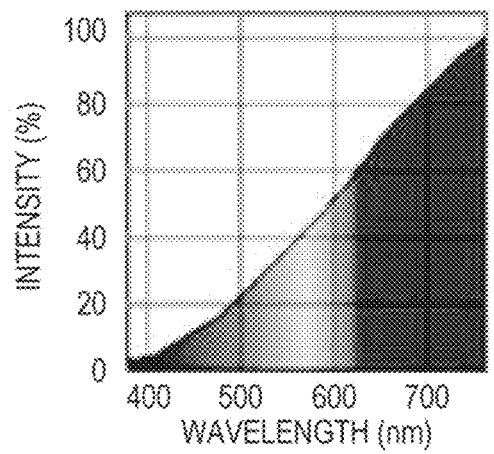
FIG. 10C is a diagram illustrating an example of spectral data regarding an incandescent lamp.

FIGS. 10A to 10C are diagrams illustrating an example of spectral data regarding artificial light stored in the memory 203. FIG. 10A illustrates an example of spectral data regarding LED light. FIG. 10B illustrates an example of spectral data regarding fluorescent light. FIG. 10C illustrates an example of spectral data regarding incandescent light. The memory 203 may also store data regarding a spectrum of light from another light source such as a halogen lamp, as well as the data illustrated in FIGS. 10A to 10C.

Figure 11:
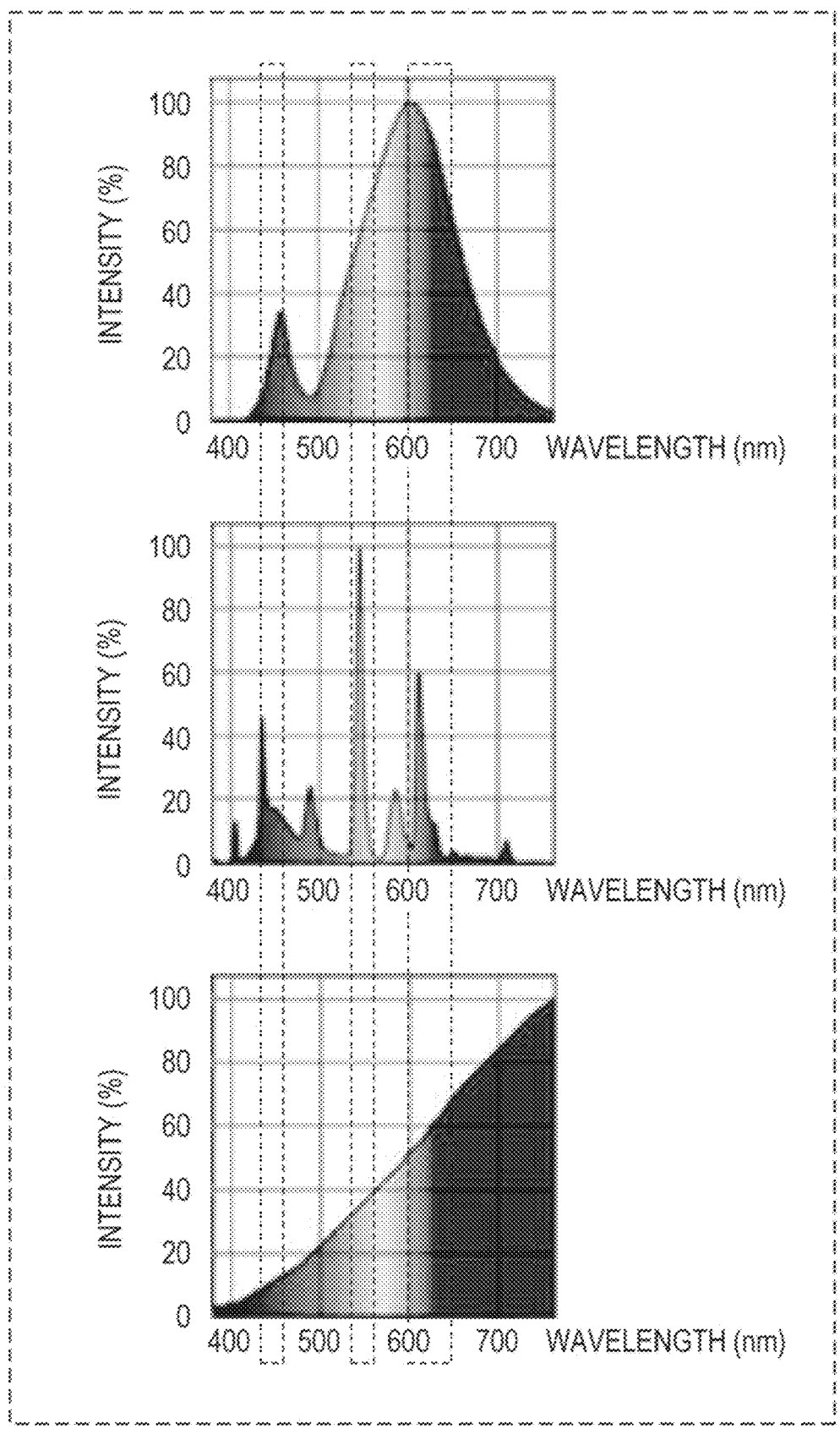
FIG. 11 is a diagram illustrating three reference wavelength ranges in the examples of spectra illustrated in FIGS. 10A to 10C with broken-line frames.

FIG. 11 is a diagram illustrating the three reference wavelength ranges in the examples of spectra illustrated in FIGS. 10A to 10C with broken-line frames. An LED lamp generates white light by exciting phosphors (yellow and red) with blue light from a blue LED. Light from an LED lamp, therefore, has a peak in blue and peaks in green to red. In many cases, a peak in blue is caused by light of 440 to 460 nm from a GaN LED, a peak in green to yellow is caused by light from a YAG phosphor, and a peak in red is caused by light of 600 to 650 nm from a CASN phosphor. Color temperature is adjusted by adjusting a ratio of these three wavelength ranges. If there is a peak of a spectrum within a wavelength range of 440 to 460 nm, which corresponds to blue, and there is a bottom around 480 nm, it can be estimated that an LED lamp is used. Color temperature can also be estimated from components in a wavelength range of 530 to 550 nm, which corresponds to green, and a wavelength range of 600 to 650 nm, which corresponds to red.

A fluorescent lamp includes a combination of a broadband phosphor and a narrowband phosphor, Fluorescent light has a peak around 440 nm based on light from the phosphors. This feature is similar to that of LED light, but fluorescent light also has, unlike LED light, a sharp peak around 550 nm caused by light from the phosphors. It can be determined that a fluorescent lamp is used by comparing the amount of data regarding a component in a wavelength range of 540 to 560 nm and the amount of data regarding a component in an adjacent wavelength range and detecting this peak.

Incandescent light does not have peaks and spectral intensity thereof is higher at longer wavelengths. Whether an LED lamp, a fluorescent lamp, or an incandescent lamp is used can be determined on the basis of a ratio of components in a total of four wavelength ranges, namely the wavelength ranges of 440 to 460 nm and 540 to 560 nm and wavelength ranges adjacent to these two wavelength ranges.

Accuracy of estimation further improves especially for incandescent light by also taking into consideration a component in the wavelength range of 600 to 650 nm, which corresponds to red.

After estimating a type of artificial light and color temperature, the server 200 stores spectral data regarding the estimated type of artificial light in the memory 203 in step S556 in FIG. 9.

Figure 12:
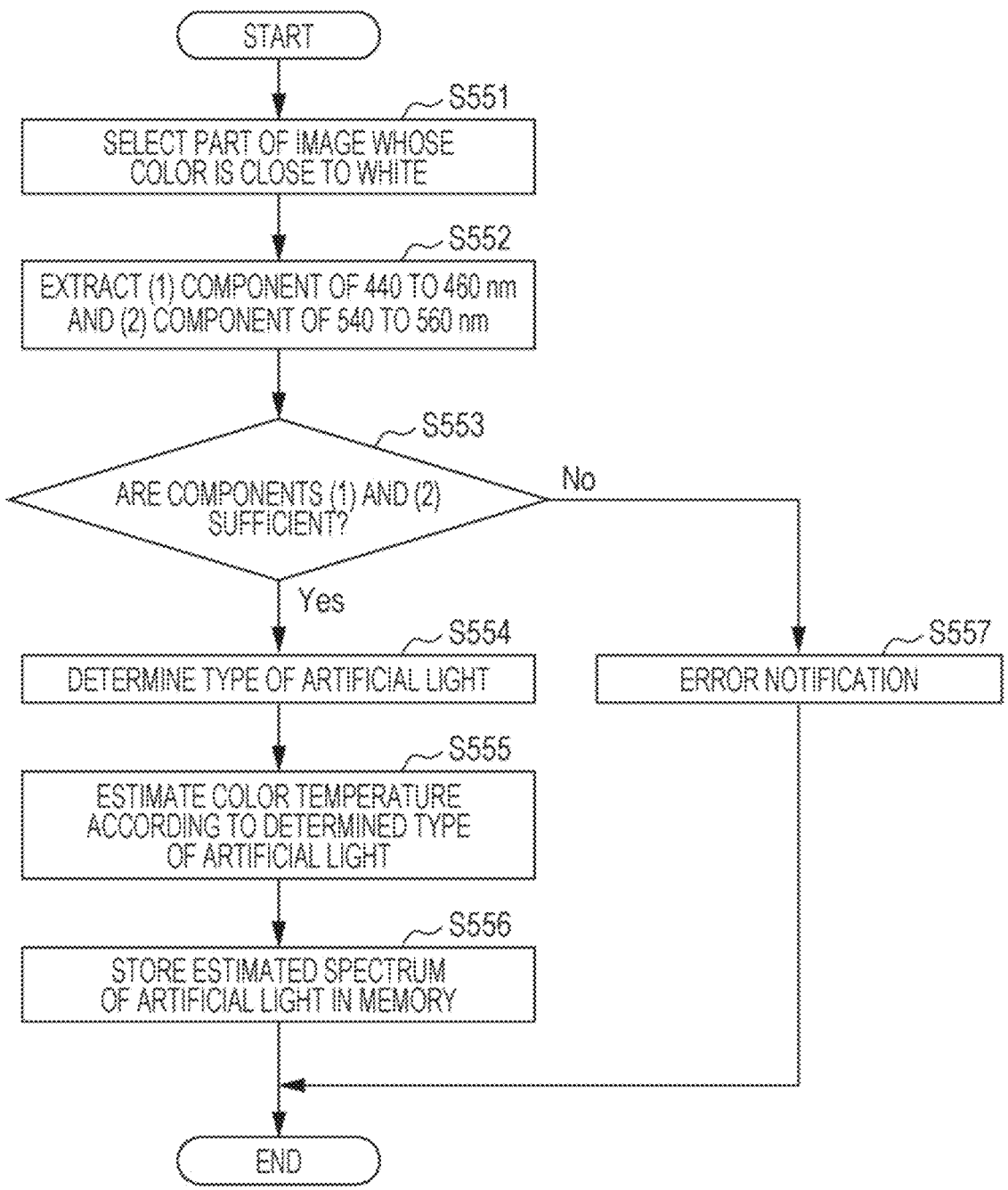
FIG. 12 is a flowchart illustrating step S550 more specifically.

Although the wavelength ranges of 440 to 460 nm, 540 to 560 nm, and 600 to 650 nm are selected as three reference wavelength ranges and a spectrum of artificial light is estimated on the basis of components in these wavelength ranges in the present embodiment, this is just an example. As illustrated in FIG. 12, for example, the wavelength range of 600 to 650 nm may be excluded as a reference wavelength range. In an example illustrated in FIG. 12, only the component of 440 to 460 nm and the component of 540 to 560 nm are extracted in step S552. In step S553, whether the amount of data regarding the component of 440 to 460 nm and the amount of data regarding the component of 540 to 560 nm are sufficient is determined. In many cases, a type of artificial light and color temperature can be estimated only by examining information in the wavelength range corresponding to blue and the wavelength range corresponding to green as in this example. Alternatively, only the wavelength range corresponding to blue may be set as a reference wavelength range. If the amount of data regarding a blue spectral component included in spectral data in the reference wavelength range is smaller than a reference value, it may be determined that it is difficult to identify the first background light.

FIG. 5 will be referred to again. After estimating the spectrum of the background light in step S530 or 3550, the server 200 generates, in step S570, a test image for each of the scenes. Data regarding the test images is transmitted to the seller terminal 100. If the seller approves the test images, the server 200 stores, in step S580, test image data for each of the scenes, that is, second image data, in the storage medium such as the memory 203.

Figure 13:
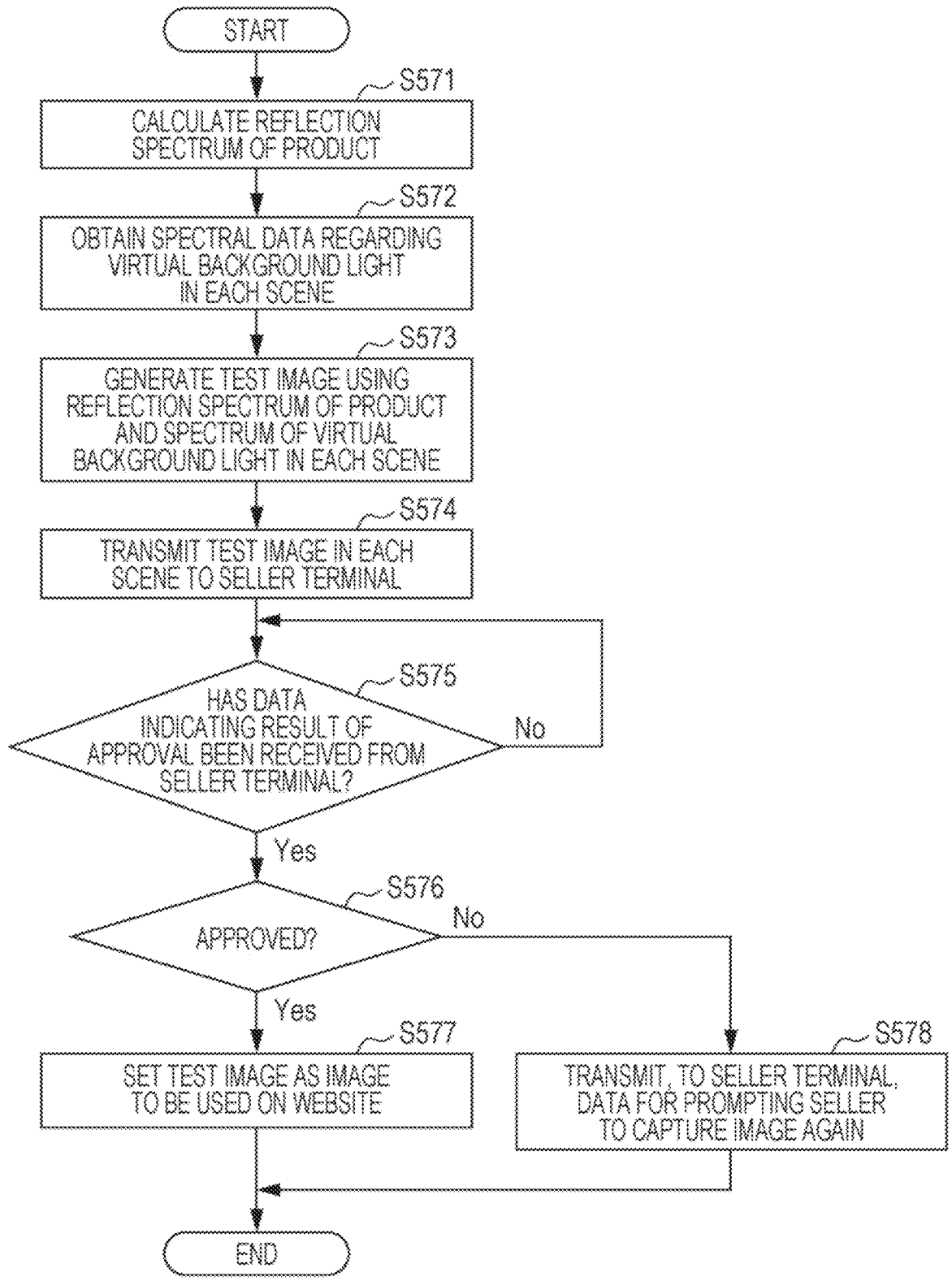
FIG. 13 is a flowchart illustrating a specific example of a process for generating test images in step S570.

FIG. 13 is a flowchart illustrating a specific example of a process for generating test images in step S570. After estimating a spectrum of background light, the server 200 calculates an absolute reflection spectrum of a target product (step S571), The server 200 normalizes a hyperspectral image of the product with the estimated spectrum of the background light. More specifically, the server 200 generates data regarding a reflection spectrum of the product by dividing a value of each of pixels of the hyperspectral image of the product at each wavelength by a value of the estimated spectrum of the background light at the wavelength. This reflection spectrum will be referred to as an "absolute reflection spectrum".

Next, the server 200 obtains spectral data regarding virtual background light in each of scenes from the memory 203 (step S572).

Next, the server 200 generates a test image for each of the scenes using the calculated reflection spectrum of the product and an obtained spectrum of the virtual background light in the scene (step S573). More specifically, the server 200 calculates a value of each of pixels of a test image for each of the scenes by multiplying a value of the reflection spectrum of the product at each wavelength and a value of the spectrum of the virtual background light at the wavelength.

After generating the test image for each of the scenes, the server 200 transmits data regarding the test images to the seller terminal 100, which is an uploader (step S574). Upon receiving the data regarding the test images, the seller terminal 100 displays, on the display 105, the test images and a screen for allowing the seller to select whether to approve the test images. The seller selects whether to approve the test images in accordance with the screen. The seller terminal 100 then transmits data indicating a result of approval to the server 200.

The server 200 determines whether a result of approval has been received from the seller terminal 100 (step S575). If so, the server 200 determines whether test data has been approved (step S576). If so, the server 200 sets the test image for each of the scenes as an image to be actually used on a website (step S577), In this case, it is determined that the estimation of a spectrum of background light and the calculation of an absolute reflection spectrum of the product are correct, and the generated test images are used. If the test data has not been approved, the server 200 transmits, to the seller terminal 100, data for prompting the seller to capture a hyperspectral image again (step S578). It is considered in this case that the estimation of a spectrum of background light is incorrect. Data indicating an error notification, an instruction to capture a hyperspectral image again, an instruction to change a place of capture, an instruction to capture a hyperspectral image in front of a white wall, or the like, therefore, may be transmitted to the seller terminal 100 as in step S590 illustrated in FIG. 5 or step S557 illustrated in FIG. 9.

Figure 14:
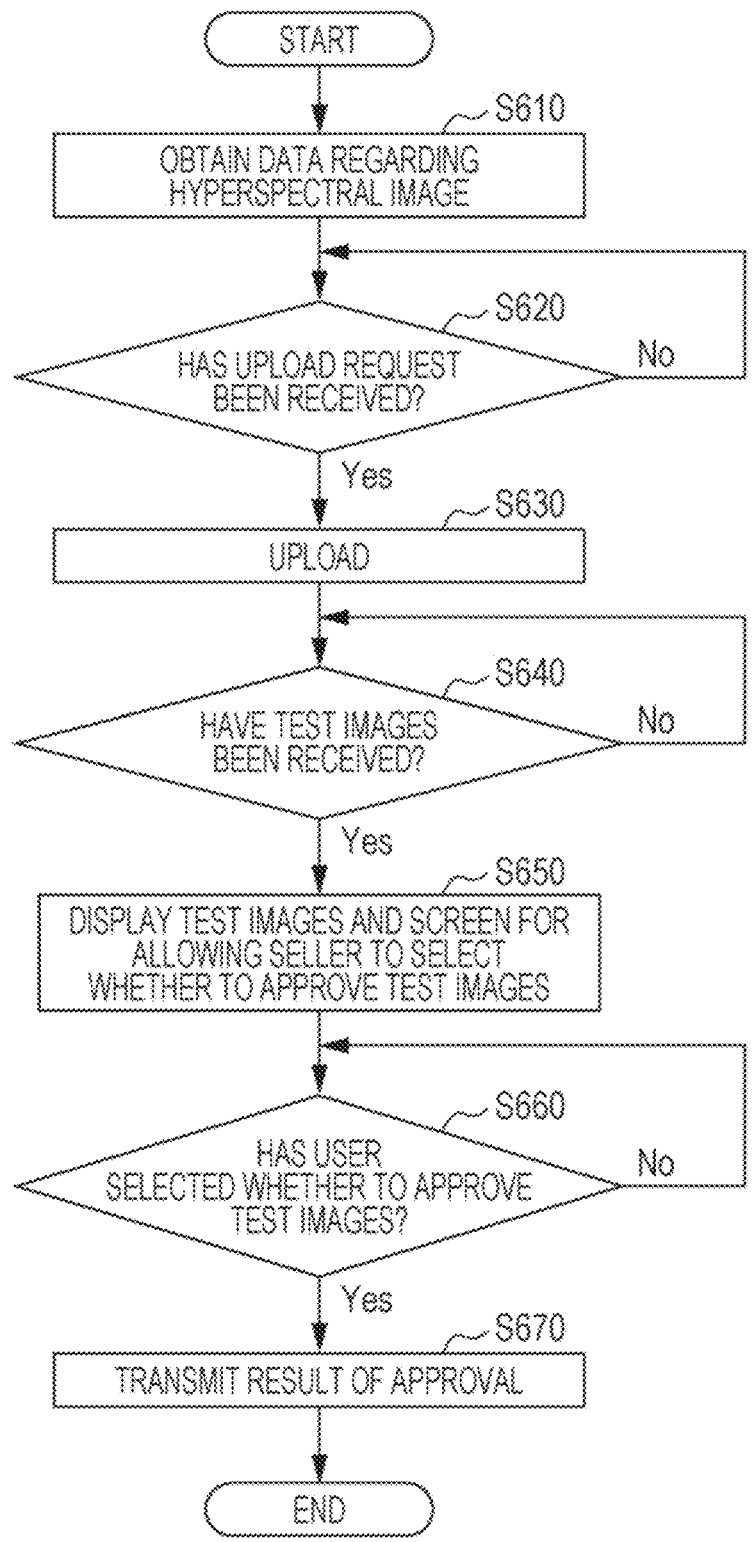
FIG. 14 is a flowchart illustrating an example of a process performed by a processor of the seller terminal.

FIG. 14 is a flowchart illustrating an example of a process performed by the processor 102 of the seller terminal 100 according to the present embodiment. The seller terminal 100 in this example first obtains, in step S610, data regarding a hyperspectral image generated by the camera 101 from the memory 103. If the seller terminal 100 receives an upload instruction from the seller in step S620, the seller terminal 100 uploads the data regarding the hyperspectral image to the server 200 (step S630). Next, the seller terminal 100 waits until the server 200 transmits test images (step S640), Upon receiving test images, the seller terminal 100 displays the test images and a screen for allowing the seller to select whether to approve the test images (step S650). As described above, the test images, which are candidate images for different scenes, generated by the server 200 and the screen for allowing the seller to select whether to approve the test images are displayed on the display 105. If the seller selects whether to approve the test images in step S660, the seller terminal 100 transmits a result of approval to the server 200 (step S670).

If it is difficult for the server 200 to estimate a spectrum of background light for the uploaded hyperspectral image after step S630, the server 200 can transmit a notification indicating that it is difficult to estimate a spectrum of background light for the uploaded hyperspectral image. In this case, an instruction for prompting the seller to capture a hyperspectral image again, for example, can be displayed on the display 105. If the seller does not approve the test images in step S660, too, an instruction for prompting the seller to capture a hyperspectral image again, for example, is displayed on the display 105 after step S670.

Figure 15:
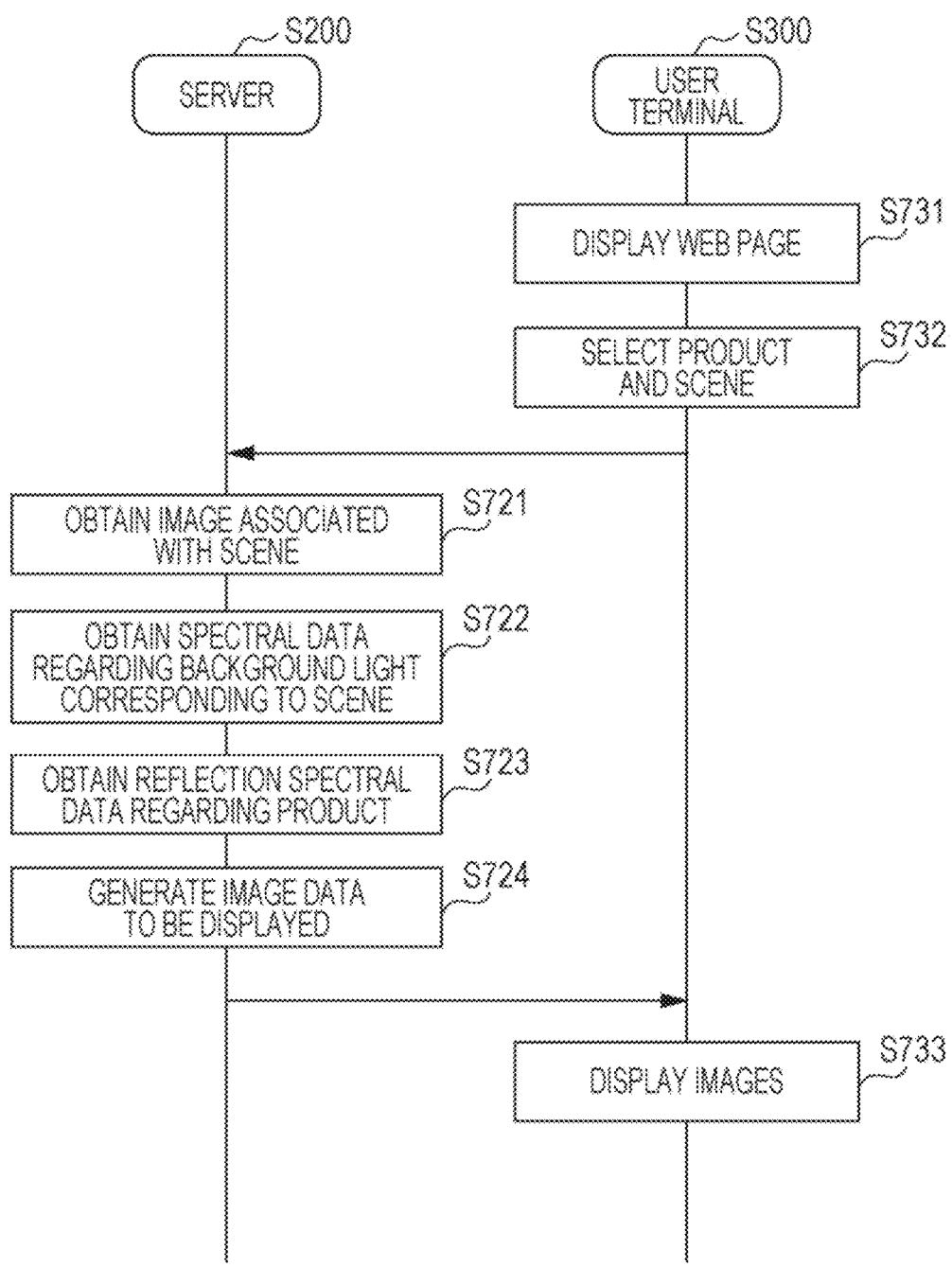
FIG. 15 is a sequence diagram illustrating an example of a process performed by the server and the user terminal.

FIG. 15 is a sequence diagram illustrating an example of a process performed by the server 200 and the user terminal 300. In this example, the user who purchases a product selects one of scenes, and the server 200 generates second image data in accordance with the selected scene.

First, the user terminal 300 displays a web page (step S731). The user who purchases a product selects a desired product and a scene on the web page (step S732). The server 200 obtains, from the memory 203, image data associated with the selected product and the selected scene (step S721), The image data can include, for example, image data regarding a background that suits the selected scene. Next, the server 200 obtains, from the memory 203, spectral data regarding background light corresponding to the selected scene (step S722). The server 200 also obtains, from the memory 203, reflection spectral data regarding the product calculated by the above-described method in advance (step S723). The server 200 generates, using the data obtained in steps S721 to S723, image data regarding the product and the scene to be displayed (step S724), In step S724, the server 200 first multiplies the reflection spectral data and the spectral data regarding the background light corresponding to the selected scene for each of pixels to generate image data regarding the product to be displayed. This image data and the image data obtained in step S721 are combined together to generate the image data regarding the selected product and scene. The user terminal 300 displays images of the product and the scene on the basis of the data transmitted from the server 200 (step S733).

As described above, according to the present embodiment, an image displayed in accordance with a scene selected by the user can be appropriately corrected even if background light at a time of capture of a hyperspectral image of a product is unknown. The user can check how a product looks in a desired scene before purchasing the product. As a result, a displayed image of a product does not give a misleading impression significantly different from that of an actual product.

Modifications

Figure 16:
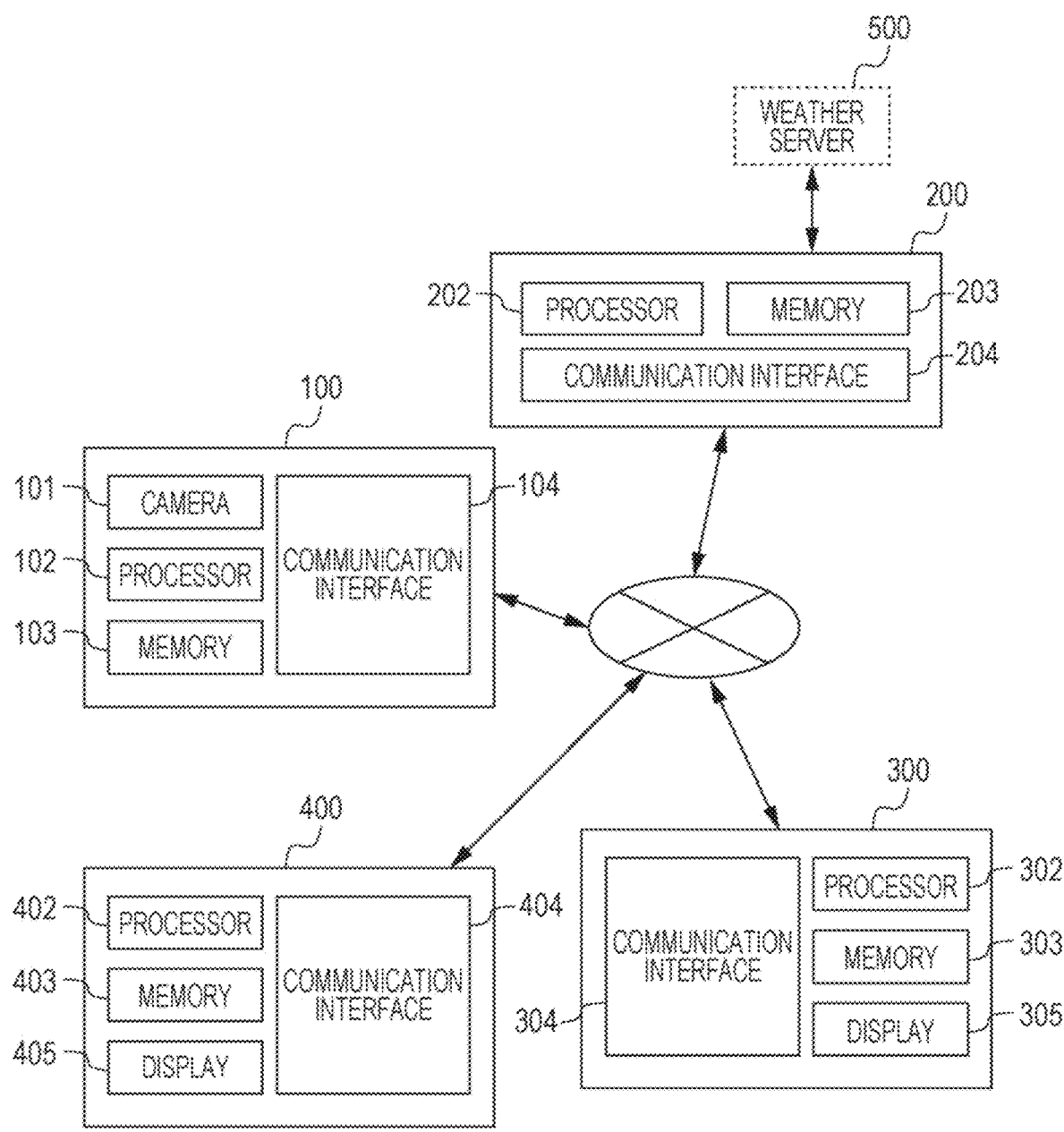
FIG. 16 is a diagram illustrating an example of a system that further includes a business operator terminal used by a business operator who manages the server.
Figure 17:
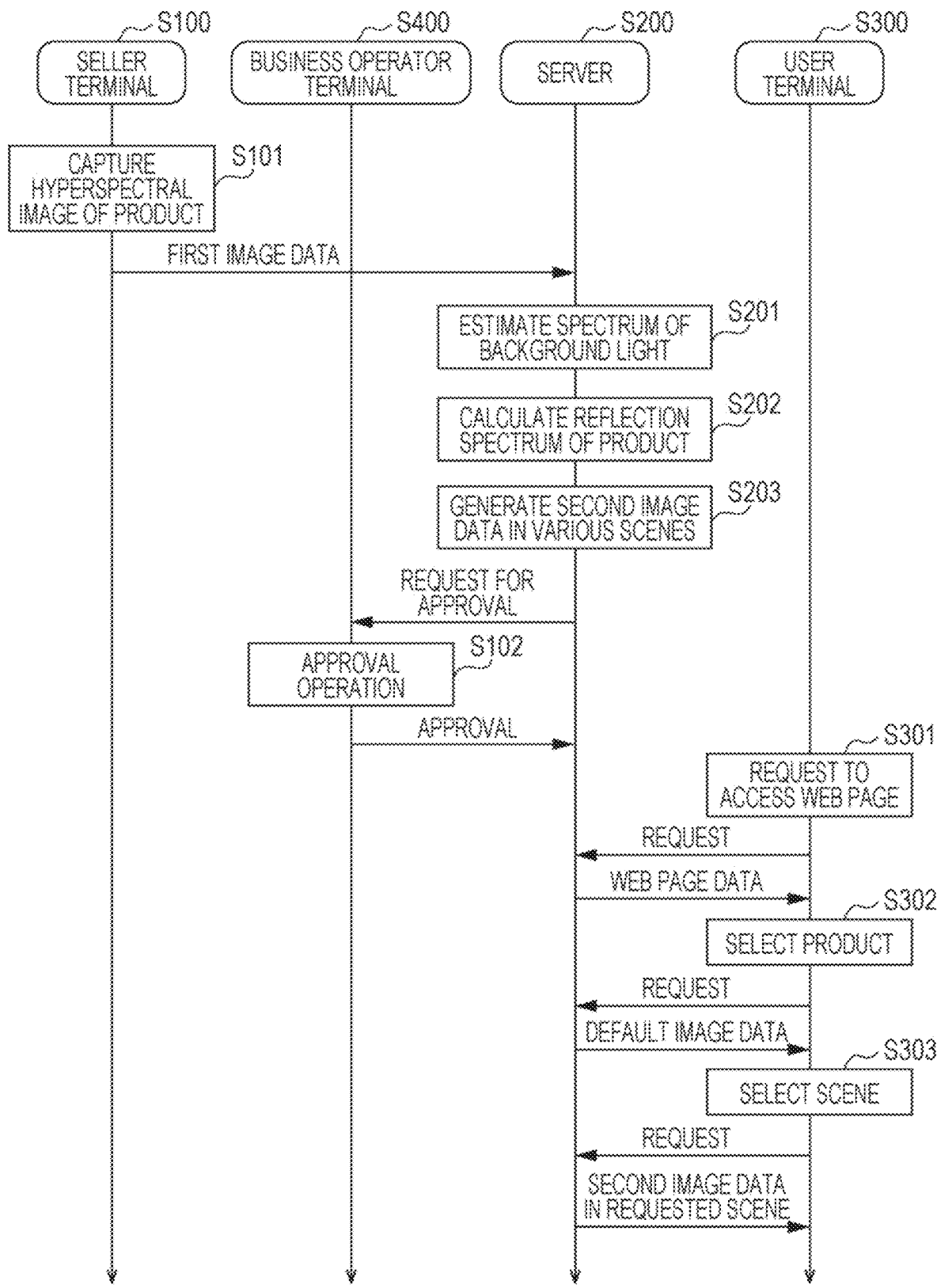
FIG. 17 is a sequence diagram illustrating an outline of a process according to a modification.

Next, some modifications of the above embodiment will be described,

FIG. 16 is a diagram illustrating an example of a system further including a business operator terminal 400 used by the business operator who manages the server 200. The business operator terminal 400 is a computer that includes a processor 402, a memory 403, a display 405, and a communication interface 404. FIG. 17 is a sequence diagram illustrating an outline of a process according to a modification. In this example, as illustrated in FIG. 17, the business operator terminal 400, not the seller terminal 100, performs the approval operation after the seller terminal 100 uploads a hyperspectral image to the server 200. The generation of second image data and subsequent approval may thus be performed by the same business operator.

Figure 18:
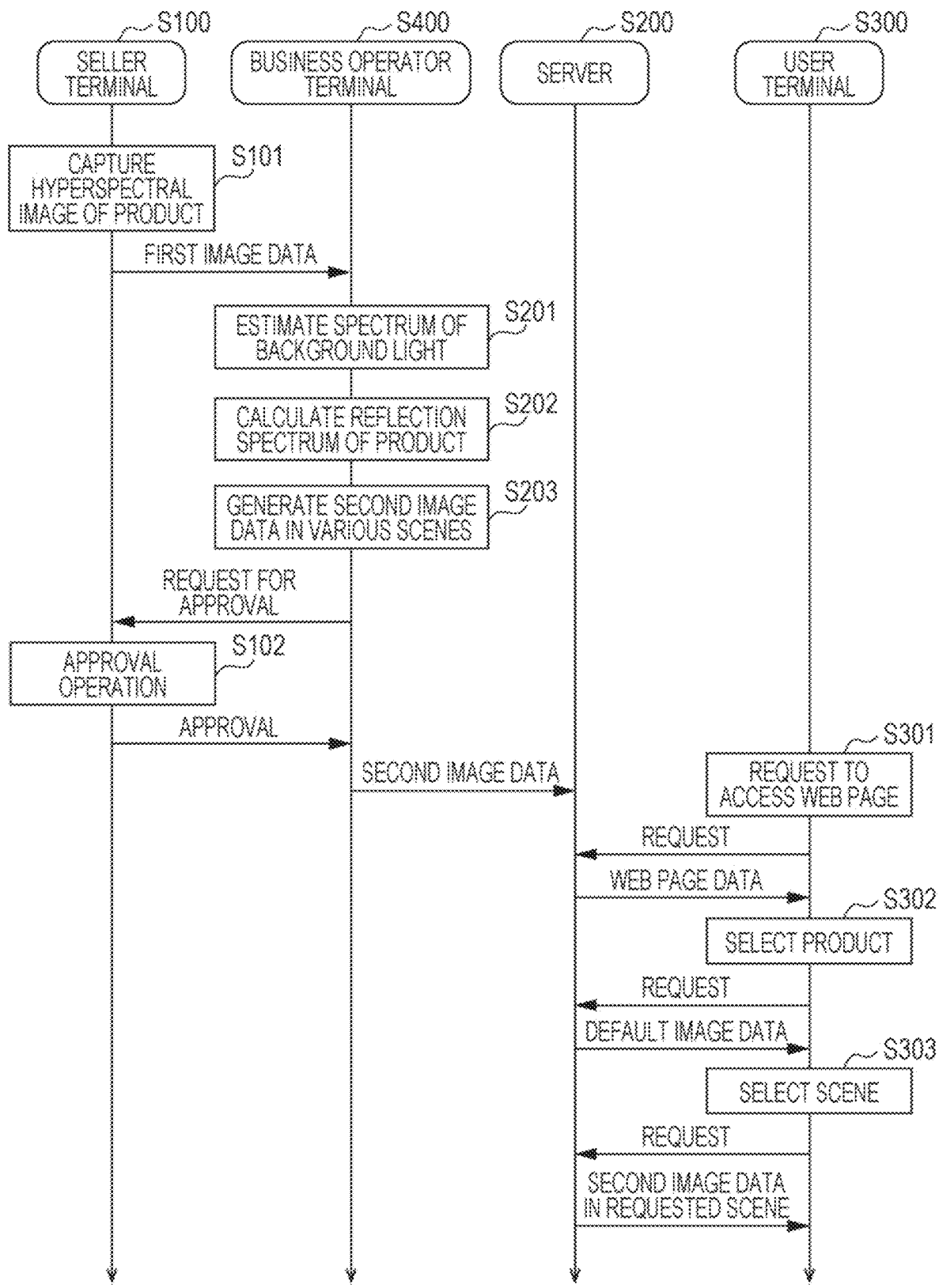
FIG. 18 is a sequence diagram illustrating an outline of a process according to another modification.

Alternatively, as illustrated in FIG. 18, the business operator terminal 400 may perform steps 3201 to S203 and upload generated second image data to the server 200 that provides the web service. Alternatively, the business operator terminal 400 may perform only steps S201 and S202 among steps S201 to S203 and upload generated reflection spectral data regarding a product to the server 200, and the server 200 may generate second image data (step S203). Alternatively, the business operator terminal 400 may perform only step S201 among steps S201 to S203 and upload generated first spectral data to the server 200 along with first image data, and the server 200 may calculate a reflection spectrum of the product (step S202) and generate second image data (step S203).

Figure 19:
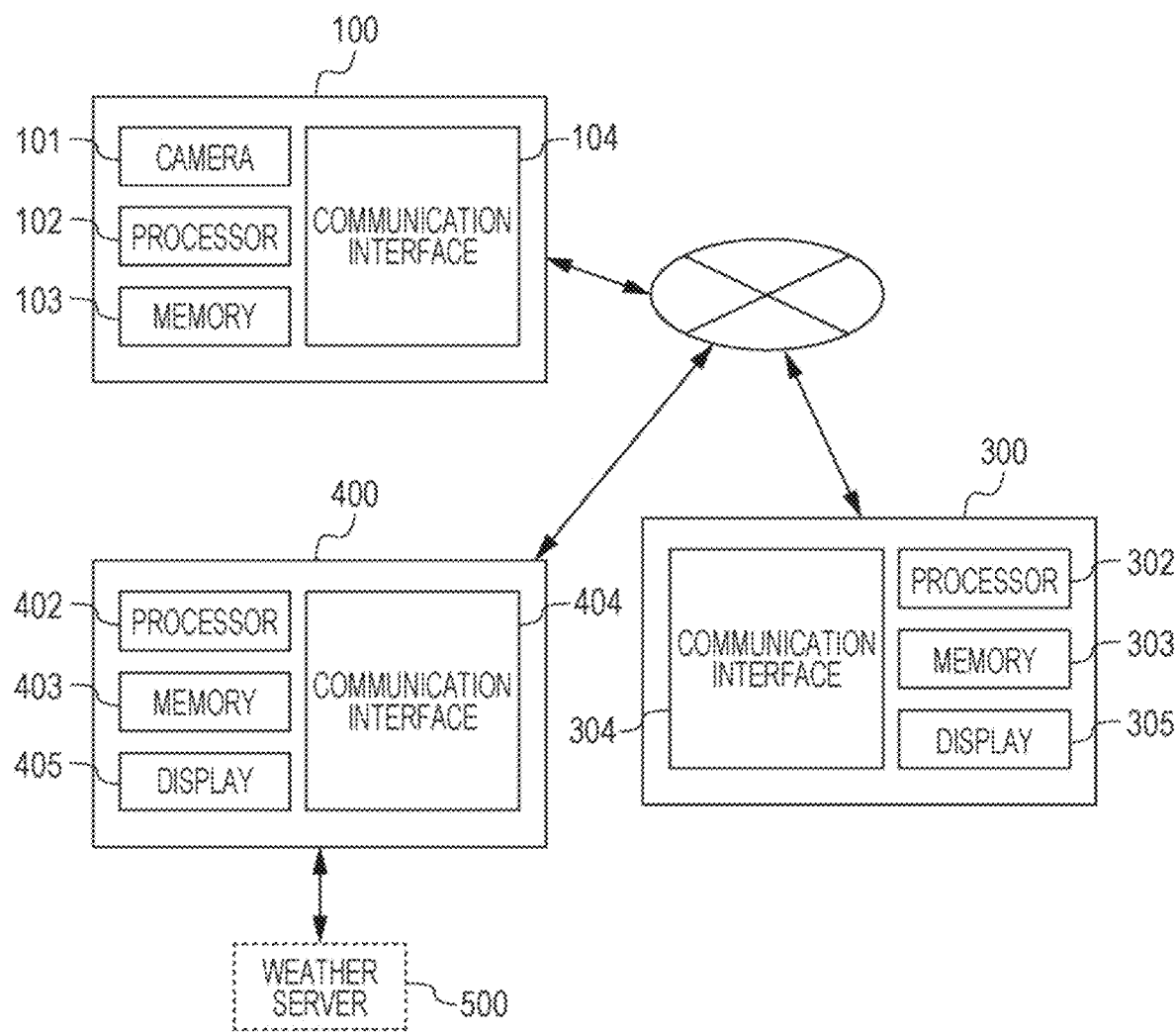
FIG. 19 is a diagram illustrating a modification in which the business operator terminal also functions as the server.

FIG. 19 is a diagram illustrating a modification in which the business operator terminal 400 also functions as the server 200. As in this example, the above-described web service may be provided using the business operator terminal 400, which is a general-purpose computer such as a personal computer, without preparing a dedicated server.

Although a user who is different from the business operator who manages the web service uses the seller terminal 100 in the above examples, a mode employed is not limited to this. The business operator who manages the web service may also sell products. In this case, the business operator uses the seller terminal 100.

Figure 20:
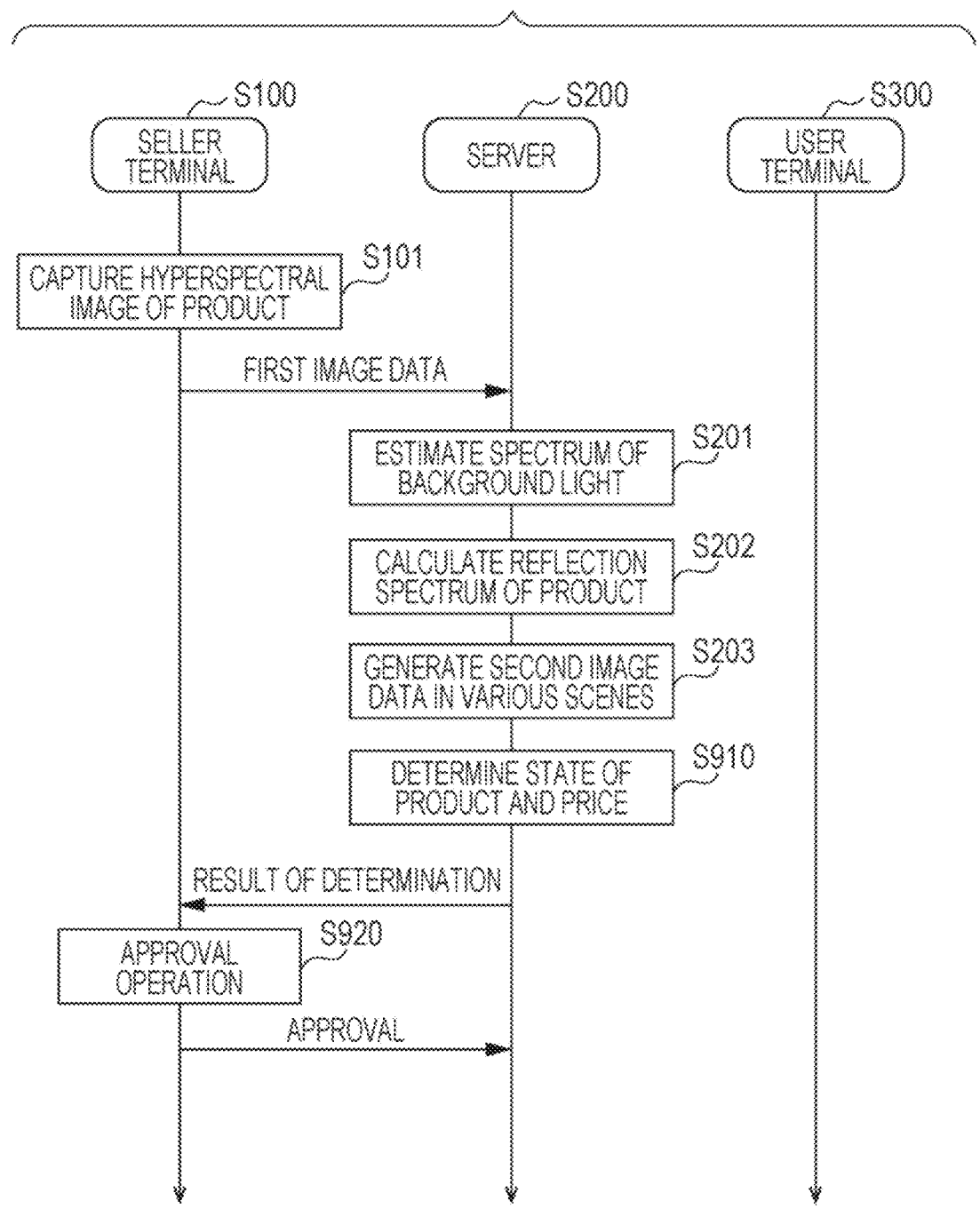
FIG. 20 is a sequence diagram illustrating a process performed by a system according to another modification.

FIG. 20 is a sequence diagram illustrating a process performed by a system according to another modification. A configuration in this modification is the same as that illustrated in FIG. 1, but the operation of the server 200 is different. The server 200 in this example generates second image data in each of scenes in step S203 and, in step S910, determines a state of a product and a price or a rate of discount from a list price and transmits a result of the determination to the seller terminal 100. The server 200 determines a material of the product, scratches on the product, and wear and tear of the product on the basis of a reflection spectrum of the product calculated in step S202. The storage medium such as the memory 203 stores in advance, for example, data regarding products sold in the past, reflection spectra, and prices associated with one another. A state of a product shown in an uploaded image can be determined on the basis of accumulated data, and an appropriate price can be estimated. A state and a price of a product may be determined, for example, using a model trained in advance using a machine learning algorithm, instead. A state and a valid price can be automatically determined for a product shown in an uploaded image on the basis of an enormous amount of data accumulated in the past.

The result of the determination is fed back to the seller terminal 100. The seller determines whether to approve the suggested price (step S920). At this time, the seller may be allowed to input information indicating whether the result of the determination as to a material, scratches, and wear and tear is correct. The information input by the seller may be stored in the memory 203 of the server 200 and displayed as reference information when a user who purchases a product views a web page for the product. In addition, a mechanism for enabling the user to evaluate the result of the determination made by the seller after the user purchases the product may be provided. In this case, whether the seller has fairly evaluated the product sold thereby can be monitored.

An example where a technique for processing an image in the present disclosure is applied to images of products sold online has been mainly described above. The technique in the present disclosure, however, is not limited to images of such products and may be applied to hyperspectral images of any articles.

The technique in the present disclosure can be used to process hyperspectral images of articles. For example, the technique in the present disclosure can be used to process images of products sold online using a network such as the Internet,

What is claimed is:

1. A method for processing image data, the method comprising:
    obtaining first image data indicating a hyperspectral image of a target captured in first background light;
    generating, on a basis of the first image data, first spectral data indicating an estimated spectrum of the first background light; and
    generating, from the first image data, at least one piece of second image data indicating at least one image of the target in at least one type of second background light, which is different from the first background light, using at least one piece of second spectral data indicating at least one spectrum of the at least one type of second background light and the first spectral data.
2. The method according to claim 1,
    wherein the at least one type of second background light includes different types of second background light,
    wherein the at least one piece of second image data includes pieces of second image data, and
    wherein each of the pieces of second image data indicates a corresponding one of the at least one image of the target in a corresponding one of the different types of second background light.
3. The method according to claim 2,
    wherein the different types of second background light include sunlight and one or more types of artificial light.
4. The method according to claim 1,
    wherein the generating at least one piece of second image data includes
        generating, from the first image data using the first spectral image, reflection spectral data indicating a reflection spectrum of the target, and
        generating the at least one piece of second image data using the reflection spectral data and the at least one piece of second spectral data.
5. The method according to claim 1,
    wherein the generating first spectral data includes
        determining, on a basis of the first image data, whether the hyperspectral image has been captured outdoors or indoors, and
        generating the first spectral data through different processes in accordance with whether the hyperspectral image has been captured outdoors or indoors.
6. The method according to claim 5,
    wherein, after it is determined, in the determining, that the hyperspectral image has been captured outdoors, the generating first spectral data further includes
        obtaining data indicating at least one selected from the group consisting of a date, a time, a position, and weather at a time when the hyperspectral image has been captured,
        obtaining spectral data regarding sunlight associated with the at least one selected from the group consisting of a date, a time, a position, and weather, and
        storing the spectral data regarding the sunlight in a storage medium as the first spectral data.
7. The method according to claim 5,
    wherein, after it is determined, in the determining, that the hyperspectral image has been captured indoors, the generating first spectral data further includes
        estimating a type of artificial light to which the first background light belongs on a basis of spectral data regarding at least one preset reference wavelength range, the spectral data being extracted from the first image data, and
        storing spectral data regarding the type of artificial light in a storage medium as the first spectral data.
8. The method according to claim 7,
    wherein the at least one reference wavelength range includes a wavelength range corresponding to blue and a wavelength range corresponding to green.
9. The method according to claim 7,
    wherein the at least one reference wavelength range includes a wavelength range corresponding to blue, a wavelength range corresponding to green, and a wavelength range corresponding to red.
10. The method according to claim 1,
    wherein the hyperspectral image includes information regarding at least four wavelength ranges.
11. A method for processing image data executed by a server computer that provides a website for selling a product over a network, the method comprising:
    obtaining first image data indicating a hyperspectral image of a first product captured in first background light;
    generating, on a basis of the first image data, first spectral data indicating an estimated spectrum of the first background light;
    generating, from the first image data, at least one piece of second image data indicating at least one image of the first product in at least one type of second background light, which is different from the first background light, using at least one piece of second spectral data indicating at least one spectrum of the at least one type of second background light and the first spectral data; and
    transmitting, to a user terminal used by a user of the website in response to a request from the user terminal, data regarding a web page including the at least one piece of second image data.

12. The method according to claim 11,
wherein the obtaining first image data includes receiving the first image data from a seller terminal used by a seller of the first product, and
the method further includes:
   transmitting, after generating the at least one piece of second image data, a request for obtaining an approval for the at least one piece of second image data to the seller terminal; and
   receiving, from the seller terminal, data indicating that the at least one piece of second image data has been approved, wherein the transmitting data regarding a web page to a user terminal is performed after the data indicating that the at least one piece of second image data has been approved is received.

13. The method according to claim 11,
wherein the transmitting data regarding a web page to a user terminal includes
   transmitting, to the user terminal in response to a first request from the user terminal, data regarding a first web page including default image data regarding the first product, and
   transmitting, to the user terminal in response to a second request from the user terminal, data regarding a second web page, which is obtained by replacing the default image data on the first web page with the at least one piece of second image data or adding the at least one piece of second image data to the default image data on the first web page.

14. The method according to claim 13,
wherein the at least one type of second background light includes types of second background light, and
wherein the first web page includes a display area for allowing the user to select one of scenes associated in one-to-one correspondence with the types of second background light.

15. The method according to claim 14,
wherein the display area includes areas indicating the scenes in one-to-one correspondence, and
wherein, in the display area, the areas are displayed in order according to a number of times that each of the scenes has been selected on the website in past.

16. The method according to claim 14, further comprising:
   receiving, in a case where one of the scenes is selected, the second request,
   wherein the second web page further includes image data regarding at least one second product determined on a basis of a number of times that the at least one second product has been displayed along with the selected scene.

17. The method according to claim 14, further comprising:
   receiving, in a case where one of the scenes is selected, the second request,
   wherein the second web page further includes image data indicating at least one second product in, among the types of second background light, a type of second background light associated with the selected scene.

18. The method according to claim 11,
wherein the obtaining first image data includes receiving the first image data from a seller terminal used by a seller of the first product, and
wherein the generating first spectral data includes
   determining, on a basis of spectral data regarding at least one preset reference wavelength range, the spectral data being extracted from the first image data, whether the first background light is identifiable, and
   transmitting, if the first background light is not identifiable, instruction data for prompting the seller to capture another hyperspectral image of the product in background light different from the first background light.

19. The method according to claim 18,
wherein the at least one reference wavelength range includes a wavelength range corresponding to blue, and
wherein, upon determining that an amount of data regarding a component in the wavelength range corresponding to blue included in the spectral data regarding the at least one reference wavelength range is smaller than a reference value, the determining includes determining that the first background light is not identifiable.

20. The method according to claim 11, wherein the first product is a fashion item.

21. The method according to claim 11,
wherein the hyperspectral image includes information regarding at least four wavelength ranges.

22. An image data processing apparatus comprising:
a computer that executes the method according to claim 1.

23. A nonvolatile computer-readable storage medium storing a program for causing a computer to execute the method according to claim 1.

24. An image data processing system comprising:
an image processing computer; and
a server computer that provides a website for selling a product over a network,
wherein the image processing computer
   obtains first image data indicating a hyperspectral image of the product captured in first background light,
   generates, on a basis of the first image data, first spectral data indicating an estimated spectrum of the first background light, and
   generates, from the first image data, at least one piece of second image data indicating at least one image of the product in at least one type of second background light, which is different from the first background light, using at least one piece of second spectral data indicating at least one spectrum of the at least one type of second background light and the first spectral data, and
wherein the server computer transmits, to a user terminal used by a user of the website in response to a request from the user terminal, data regarding a web page including the at least one piece of second image data.

* * * * *